United States Patent
Yukawa

(10) Patent No.: US 7,709,417 B2
(45) Date of Patent: May 4, 2010

(54) SECURITY STICKER AND METHOD FOR MANUFACTURING THE SAME

(75) Inventor: Shigeo Yukawa, Wakayama (JP)

(73) Assignee: Kiwa Chemical Industry Co., Ltd., Wakayama (JP)

( * ) Notice: Subject to any disclaimer, the term of this patent is extended or adjusted under 35 U.S.C. 154(b) by 1089 days.

(21) Appl. No.: 10/564,875

(22) PCT Filed: Nov. 12, 2004

(86) PCT No.: PCT/JP2004/016853

§ 371 (c)(1),
(2), (4) Date: Jan. 17, 2006

(87) PCT Pub. No.: WO2005/048216

PCT Pub. Date: May 26, 2005

(65) Prior Publication Data

US 2006/0211572 A1    Sep. 21, 2006

(30) Foreign Application Priority Data

Nov. 14, 2003 (JP) .............................. 2003-386029

(51) Int. Cl.
*B41M 5/20* (2006.01)
*B41M 5/24* (2006.01)

(52) U.S. Cl. .......................... 503/227; 283/72; 283/81; 283/103; 428/916; 427/146; 427/152

(58) Field of Classification Search ................ 503/227; 283/72, 81, 103; 428/916; 427/146, 152
See application file for complete search history.

(56) References Cited

U.S. PATENT DOCUMENTS 4,663,213 A    5/1987    Bailey et al.
(Continued)

FOREIGN PATENT DOCUMENTS

EP         1 275 524         1/2003
(Continued)

OTHER PUBLICATIONS

Machine Translations of Abstract, Claims, and Detailed Description of Kurz, JP-2002-366036 (Dec. 20, 2002).*

*Primary Examiner*—Mark Ruthkosky
*Assistant Examiner*—David J Joy
(74) *Attorney, Agent, or Firm*—Hamre, Schumann, Mueller & Larson, P.C.

(57) ABSTRACT

The present invention is directed to providing a security sticker which is hard to be counterfeited, cannot be reused if being released and includes a printed image that is stable over a long period of time, and is directed to providing a method for manufacturing the same. The security sticker of the present invention includes: a surface resin layer (A)1 that has a weak affinity with a sublimable dye and allows the dye to penetrate; a print layer (B)2 that contains a low-molecular-weight compound with a molecular weight of 1300 or less in an amount of 0% to 20 wt % inclusive, has an affinity with the dye, and includes an image formed in a thickness direction of the layer by the dye; a self-destructive film layer (C1)3; and a pressure-sensitive adhesive layer (D1)4 in this order, wherein the self-destructive film layer (C1) includes a dye migration preventive resin layer (E) for preventing migration of the dye and a self-destructive layer (F), and the dye migration preventive resin layer (E) is a resin layer containing a certain kind of a vinyl resin as a main component, or a certain kind of a biaxially stretched film.

14 Claims, 9 Drawing Sheets

U.S. PATENT DOCUMENTS

| | | |
|---|---|---|
| 5,069,964 A | 12/1991 | Tolliver et al. |
| 5,342,821 A | 8/1994 | Pearce |
| 5,714,223 A | 2/1998 | Araki et al. |
| 5,789,341 A | 8/1998 | Furukawa |
| 5,812,316 A | 9/1998 | Ochi et al. |
| 5,866,236 A | 2/1999 | Faykish et al. |
| 5,869,160 A * | 2/1999 | Mason et al. ............. 428/40.2 |
| 6,066,594 A * | 5/2000 | Gunn et al. ................ 503/227 |
| 6,156,442 A | 12/2000 | Phillips |
| 6,261,994 B1 | 7/2001 | Bourdelais et al. |
| 6,299,213 B1 * | 10/2001 | Souparis ..................... 283/81 |
| 7,504,147 B2 | 3/2009 | Hannington |
| 2002/0149658 A1 | 10/2002 | Furukawa |
| 2002/0155952 A1 * | 10/2002 | Furukawa ................... 503/227 |
| 2003/0165668 A1 * | 9/2003 | Yukawa et al. .......... 428/195.1 |
| 2005/0148469 A1 | 7/2005 | Yakawa et al. |
| 2005/0179253 A1 | 8/2005 | Rivera et al. |

FOREIGN PATENT DOCUMENTS

| | | |
|---|---|---|
| EP | 1 302 330 | 4/2003 |
| EP | 1 415 798 | 5/2004 |
| EP | 1 504 918 | 2/2005 |
| JP | 54-39764 | 6/1978 |
| JP | 60-64302 | 4/1985 |
| JP | 61-40081 | 9/1986 |
| JP | 4-86701 | 3/1992 |
| JP | 9-277731 | 10/1997 |
| JP | 2000-192376 | 7/2000 |
| JP | 2000-206884 | 7/2000 |
| JP | 2002-14212 | 1/2002 |
| JP | 2002-67208 | 3/2002 |
| JP | 2002-79751 | 3/2002 |
| JP | 2002-366036 | 12/2002 |
| JP | 2003-231346 | 8/2003 |

* cited by examiner

SECURITY STICKER AND METHOD FOR MANUFACTURING THE SAME

TECHNICAL FIELD

The present invention relates to a security sticker and a method for manufacturing the same.

BACKGROUND ART

Conventionally, registered vehicles in every country in the world are provided with numbers that are unique to the respective vehicles, and each vehicle is provided with number plates including such a number on its front and back sides. However, since the number of stolen vehicles has increased recently, and the number plates of such stolen vehicles can be replaced by those of other vehicles, the detection of the stolen cars has become difficult. Moreover, the cases where only number plates are stolen for criminal purposes also are increasing.

In order to solve these problems, it has been proposed to attach a sticker having vehicle information and a counterfeit-preventing function to an inner surface of a window of the vehicle. As such a sticker that is attached to a transparent object from a back side thereof so as to be observed from a front side thereof, for example, a vehicle-identifying sticker including a print layer showing vehicle information such as text information and a bar code on a support, and a self-destructive layer containing a hologram and the like formed on an upper surface of the print layer, which cannot be tampered, is proposed (for example, see Patent Document 1). This vehicle-identifying sticker is provided with a pressure-sensitive adhesive layer on the self-destructive layer side, and is attached to an object via the pressure-sensitive adhesive layer. If the thus once-attached vehicle-identifying sticker is peeled off, the self-destructive layer is destroyed, and thus the vehicle-identifying sticker cannot be reused.

In addition, as such a sticker that is attached to a transparent object from a back side thereof so as to be observed from a front side thereof, for example, a hologram sticker to be attached from a back side, in which a transparent adhesive layer, a hologram layer and a light transmission suppressing layer are laminated, is known (for example, see Patent Document 2). This light transmission suppressing layer has a dark color, and suppresses transmission of visible light toward a back surface of the hologram layer so as to enhance the visual contrast of a hologram image. Accordingly, when being observed from the transparent adhesive layer side, which is attached to the object, the hologram layer easily can be identified visually with the light transmission suppressing layer in its background. In addition, as the light transmission suppressing layer, a plastic film and the like that are colored by a dye or a pigment as appropriate can be used.

Whereas, a sharp image is formed in a film by a method including: disposing a transfer paper with an image formed thereon by an ink containing a sublimable dye on a surface of a white film layer of a laminate of the white film layer having no affinity with the sublimable dye and a transparent film layer so that the transfer paper and the white film layer may be in contact with each other; and heating them, whereby the dye is sublimated, penetrates the white film layer and diffuses in the transparent film layer so as to form an image (for example, see Patent Document 3).

In addition, another method is exemplified, which includes: printing, with the ink containing the sublimable dye, on a releasable ink jet receptive layer of a laminate including the ink jet receptive layer, a surface resin layer having no affinity with the sublimable dye and a dye fixing layer that are laminated in this order; subsequently heating the laminate so as to sublimate the sublimable dye, allow the sublimable dye to migrate into the dye fixing layer and form an image in the layer; and then removing and releasing the ink jet receptive layer (for example, see Patent Document 4). However, in the vehicle-identifying sticker of Patent Document 1 that is attached to an object, a self-destructive layer, a print layer including text information or the like and a support layer are provided in this order, when being observed from the object. Accordingly, if the support layer is shaved off by any means while the sticker is attached, the print layer can be reached. Thus, there is a problem that, if the print layer is further shaved off, and the text information or the like is modified using a means such as an ink for marker pens, subsequently, another print layer is newly formed, and the sticker can be counterfeited from its back surface side without being released.

In addition, the vehicle-identifying sticker of Patent Document 1 also has a problem that, even if the print layer is formed on the self-destructive film in order to avoid the above-described problem, an authenticating pattern such as a hologram used as the self-destructive layer is shielded by the print layer and thus is difficult to identify when being observed from the object. Then, since it is difficult to distinguish a sticker having a print layer including counterfeited text information or the like from the vehicle-identifying sticker of Patent Document 1 when being observed from the object, the thus counterfeited sticker is likely to be used with ease.

In addition, in the hologram sticker to be attached from a back side of Patent Document 2 that is attached onto an object, a transparent adhesive layer, a hologram layer and a light transmission suppressing layer are provided in this order, when being observed from the object. Accordingly, Patent Document 2 does not refer to forming an image such as text information, and even if an image is formed, the image is difficult to identify, because the dark-colored light transmission suppressing layer lies in its background.

Moreover, a film in which an image is formed according to Patent Documents 3 and 4 has a problem that sharpness of the image deteriorates over the course of time.

Patent Document 1: JP 2002-366036 A
Patent Document 2: JP 2000-206884 A
Patent Document 3: JP 9(1997)-277731 A
Patent Document 4: JP 2002-79751 A

DISCLOSURE OF INVENTION

Problem to be Solved by the Invention

In light of the above-stated conventional problems, the present invention is directed to providing a security sticker that is difficult to counterfeit, cannot be reused if it is released once and includes a printed image that is stable for a long period of time, and also is directed to providing a method for manufacturing the same.

Means for Solving Problem

The security sticker of the present invention includes:
a surface resin layer (A) that has a weak affinity with a sublimable dye and allows the dye to penetrate;
a print layer (B) that has an affinity with the dye and includes an image formed in a thickness direction of the layer by the dye;
a self-destructive film layer (C1); and
a pressure-sensitive adhesive layer (D1) in this order,
wherein the self-destructive film layer (C1) includes at least a dye migration preventive resin layer (E) for preventing migration of the dye and a self-destructive layer (F), the print layer (B) contains a low-molecular-weight compound with a molecular weight of 1300 or less in an amount of 0% to 20 wt % inclusive, the dye migration preventive resin layer (E) is a resin layer containing a vinyl resin with a glass transition temperature (Tg) of 70° C. or more and a SP value of 9.0 or more as a main component, or is a biaxially stretched film that is stretched by 10% or more in a winding direction and in a width direction respectively, the film having a shrinkage ratio of 1.0% or less in the winding direction after being heated at 150° C. for 30 minutes.

Among the security stickers, a security sticker, in which the dye migration preventive resin layer (E) is a resin layer containing a vinyl resin with a glass transition temperature (Tg) of 70° C. or more and a SP value of 9.0 or more as a main component, is called a first security sticker. A security sticker, in which the dye migration preventive resin layer (E) is a biaxially stretched film that is stretched by 10% or more in a winding direction and in a width direction respectively, the film having a shrinkage ratio of 1.0% or less in the winding direction after being heated at 150° C. for 30 minutes, is called a second security sticker, for convenience.

Another security sticker of the present invention includes:
a surface resin layer (A) that has a weak affinity with a sublimable dye and allows the dye to penetrate;
a print layer (B) that has an affinity with the dye and includes an image formed in a thickness direction of the layer by the dye;
a dye migration preventive resin layer (E) for preventing migration of the dye;
a pressure-sensitive adhesive layer (D2) or an adhesive layer (H);
a self-destructive film layer (C2); and
a pressure-sensitive adhesive layer (D1) in this order,
wherein the self-destructive film layer (C2) includes at least a supporting layer (J) and a self-destructive layer (F),
the supporting layer (J) is disposed on one surface of the self-destructive layer (F),
the print layer (B) contains a low-molecular-weight compound with a molecular weight of 1300 or less in an amount of 0% to 20 wt % inclusive,
the dye migration preventive resin layer (E) is a resin layer containing a vinyl resin with a glass transition temperature (Tg) of 70° C. or more and a SP value of 9.0 or more as a main component, or is a biaxially stretched film that is stretched by 10% or more in a winding direction and in a width direction respectively, the film having a shrinkage ratio of 1.0% or less in the winding direction after being heated at 150° C. for 30 minutes.

Among the other security stickers, a security sticker, in which the dye migration preventive resin layer (E) is a resin layer containing a vinyl resin with a glass transition temperature (Tg) of 70° C. or more and a SP value of 9.0 or more, is called a third security sticker, and a security sticker, in which the dye migration preventive resin layer (E) is a biaxially stretched film that is respectively stretched by 10% or more in a winding direction and in a width direction, the film having a shrinkage ratio of 1.0% or less in the winding direction after being heated at 150° C. for 30 minutes, is called a fourth security sticker, for convenience.

A method for manufacturing the first security sticker of the present invention hereinafter, called a first manufacturing method) includes
a dyeing step of heat-treating an original sheet of a security sticker (1) for obtaining a print layer (B),
the original sheet of the security sticker (1) including:
a surface resin layer (A) that has a weak affinity with a sublimable dye and allows the dye to penetrate;
an image formation resin layer (K) that contains a low-molecular-weight compound with a molecular weight of 1300 or less in an amount of 0% to 20 wt % inclusive, and has an affinity with the dye;
a self-destructive film layer (C1); and
a pressure-sensitive adhesive layer (D1) in this order,
wherein the self-destructive film layer (C1) includes
at least a dye migration preventive resin layer (E) for preventing migration of the dye and a self-destructive layer (F), and
the dye migration preventive resin layer (E) is a resin layer containing a vinyl resin with a glass transition temperature (Tg) of 70° C. or more and a SP value of 9.0 or more as a main component, so as to sublimate the dye from the surface resin layer (A) side, allow the dye to penetrate the surface resin layer (A), introduce the dye into the image formation resin layer (K), and form an image in the image formation resin layer (K) in a thickness direction of the image formation resin layer (K).

A method for manufacturing the second security sticker of the present invention (hereinafter, called a second manufacturing method) includes
a dyeing step of heat-treating an original sheet of a security sticker (2) for obtaining a print layer (B),
the original sheet of the security sticker (2) including:
a surface resin layer (A) that has a weak affinity with a sublimable dye and allows the dye to penetrate;
an image formation resin layer (K) that contains a low-molecular-weight compound with a molecular weight of 1300 or less in an amount of 0% to 20 wt % inclusive, and has an affinity with the dye;
a self-destructive film layer (C1); and
a pressure-sensitive adhesive layer (D1) in this order,
wherein the self-destructive film layer (C1) includes at least a dye migration preventive resin layer (E) for preventing migration of the dye and a self-destructive layer (F), and
the dye migration preventive resin layer (E) is a biaxially stretched film that is stretched by 10% or more in a winding direction and in a width direction respectively, the film having a shrinkage ratio of 1.0% or less in the winding direction after being heated at 150° C. for 30 minutes, so as to sublimate the dye from the surface resin layer (A) side, allow the dye to penetrate the surface resin layer (A), introduce the dye into the image formation resin layer (K), and form an image in the image formation resin layer (K) in a thickness direction of the image formation resin layer (K).

A method for manufacturing the third security sticker of the present invention (hereinafter, called a third manufacturing method) includes:
a dyeing step of heat-treating an original sheet of a security sticker (3) for obtaining a print layer (B),
the original sheet of the security sticker (3) including
a surface resin layer (A) that has a weak affinity with a sublimable dye and allows the dye to penetrate,
an image formation resin layer (K) that contains a low-molecular-weight compound with a molecular weight of 1300 or less in an amount of 0% to 20 wt % inclusive and has an affinity with the dye,
a dye migration preventive resin layer (E) that contains a vinyl resin with a glass transition temperature (Tg) of 70° C. or more and a SP value of 9.0 or more and prevents migration of the dye,
a pressure-sensitive adhesive layer (D2) or an adhesive layer (H), and
a releasing member (M) in this order, so as to sublimate the dye from the surface resin layer (A) side, allow the dye to penetrate the surface resin layer (A), introduce the dye into the image formation resin layer (K), and form an image in the image formation resin layer (K) in a thickness direction of the image formation resin layer (K);

a step of releasing the releasing member (M) subsequently; and a step of laminating a self-destructive film layer (C2) of a laminate with the pressure-sensitive adhesive layer (D2) or the adhesive layer (H), the laminate including the self-destructive film layer (C2) and a pressure-sensitive adhesive layer (D1) in this order, and the self-destructive film layer (C2) including at least a supporting layer (J) and a self-destructive layer (F).

A method for manufacturing the fourth security sticker of the present invention (hereinafter, called a fourth manufacturing method) includes:

a dyeing step of heat-treating an original sheet of a security sticker (4) for obtaining a print layer (B), the original sheet of the security sticker (4) including a surface resin layer (A) that has a weak affinity with a sublimable dye and allows the dye to penetrate, an image formation resin layer (K) that contains a low-molecular-weight compound with a molecular weight of 1300 or less in an amount of 0% to 20 wt % inclusive and has an affinity with the dye, a dye migration preventive resin layer (E) which is a biaxially stretched film that is respectively stretched by 10% or more in a winding direction and in a width direction, the film having a shrinkage ratio of 1.0% or less in the winding direction after being heated at 150° C. for 30 minutes, a pressure-sensitive adhesive layer (D2) or an adhesive layer (H), and a releasing member (M) in this order, so as to sublimate the dye from the surface resin layer (A) side, allow the dye to penetrate the surface resin layer (A), introduce the dye into the image formation resin layer (K), and form an image in the image formation resin layer (K) in a thickness direction of the image formation resin layer (K);

a step of releasing the releasing member (M) subsequently; and a step of laminating a self-destructive film layer (C2) of a laminate with the pressure-sensitive adhesive layer (D2) or the adhesive layer (H), the laminate including the self-destructive film layer (C2) and a pressure-sensitive adhesive layer (D1) in this order, and the self-destructive film layer (C2) including at least a supporting layer (J) and a self-destructive layer (F).

Effects of the Invention

The security sticker of the present invention includes the print layer (B) in which an image is formed in a thickness direction of the layer by sublimating a sublimable dye with excellent transparency, thus has a three-dimensional effect, and cannot be tampered by shaving off the print layer (B), thereby enhancing a counterfeit-preventing effect remarkably. In addition, since the security sticker of the present invention includes the self-destructive layer (F), it cannot be reused if it is released after being attached once. Moreover, since the security sticker of the present invention includes the print layer (B) containing a low-molecular-weight compound by a certain amount or less, and the dye migration preventive resin layer (E) that includes a vinyl resin with a certain glass transition temperature and a certain SP value or a biaxially stretched film with a certain shrinkage ratio, migration of the sublimable dye to the pressure-sensitive adhesive layer (D1) over the course of time, which causes occurrence of a blurry edge of the image and deterioration of sharpness of the image, can be prevented. Accordingly, the image printed in the print layer (B) of the security sticker of the present invention is stable for a long period of time.

DESCRIPTION OF THE INVENTION

Figure 1:
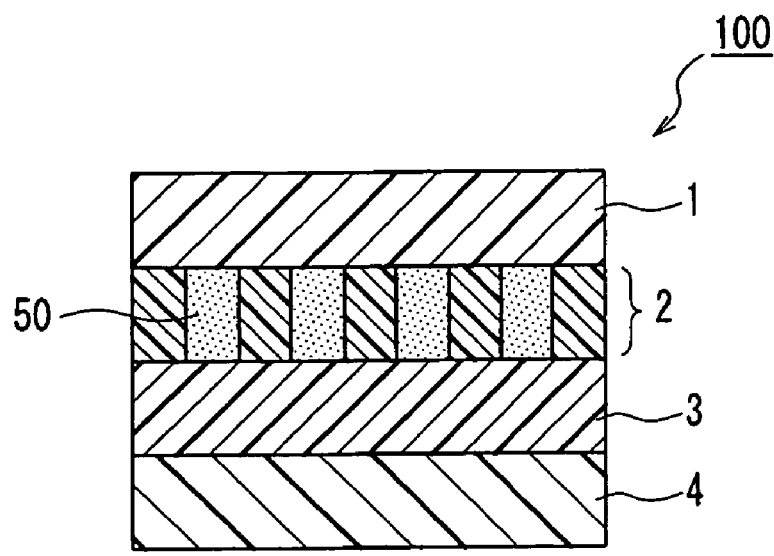
FIG. 1 is a cross-sectional view showing an example of the security sticker of the present invention.

In the first security sticker of the present invention, a flexible resin layer (G) with an elongation percentage larger than that of the dye migration preventive resin layer (E) preferably is included between the dye migration preventive resin layer (E) and the pressure-sensitive adhesive layer (D1). This is because, when the security sticker is attached to a three-dimensionally curved glass surface, if the security sticker is stretched so as to follow along the curved surface, the occurrence of a crack can be prevented, and destruction of the self-destructive layer (F) also can be prevented. Since the occurrence of the crack can be prevented, the beginning of a dye bleeding from the dye migration preventive resin layer can be suppressed.

In the first, second, third and fourth security stickers of the present invention, the self-destructive layer (F) is preferably a film obtained by subjecting a fragile film or a supporting film to a regular or irregular releasing treatment, or a film and the like including a hologram or a diffraction grating. This is because, when the security sticker is released after being attached once, the self-destructive layer (F) including a predetermined pattern is destroyed, and thus the security sticker cannot be reused. Among them, the self-destructive layer (F) is more preferably a film including a hologram or diffraction grating that has a predetermined pattern. This is because, since a special apparatus and techniques are required for manufacturing the film, and the apparatus is expensive, the counterfeit-preventing effect is high. Moreover, the film has excellent decorativeness due to having a special image effect.

In the first, second, third and fourth security stickers of the present invention, the surface resin layer (A) is preferably a white resin layer. This is because, since the image in the security sticker of the present invention with the white resin layer in its background is observed from the object side, visibility thereof is high.

In the first, second, third and fourth security stickers of the present invention, the image formed in the print layer (B) preferably includes vehicle information including a registration number of the vehicle. In addition, the image more preferably includes individual information including ownership.

In the first manufacturing method, since an image is formed in the image formation resin layer (K) by dyeing by sublimating a sublimable dye from the surface resin layer (A) side according to this manufacturing method, not only text information but also a photo image and the like can be obtained as a sharp image. Moreover, by providing the dye migration preventive resin layer (E) in the original sheet of the security sticker (1), the migration of the sublimable dye to the pressure-sensitive adhesive layer (D1) over the course of time, which causes the occurrence of a blurry edge of the image and deterioration of the sharpness of the image, can be prevented. In addition, the first manufacturing method does not require printing on the self-destructive film layer (C1), and thus is an excellent manufacturing method by which the image can be formed without destroying the predetermined pattern of the self-destructive film layer (C1).

In the first manufacturing method, it is preferable that the dyeing step is a step for obtaining the print layer (B),
  the dyeing step including:
  printing on a transfer paper by using an ink containing the dye so as to form an image on the transfer paper;
  contacting subsequently a surface of the transfer paper on which the image is formed with the surface resin layer (A) of the original sheet of the security sticker (1); and then
  treating by heat,
  the method further including a step of removing the transfer paper after the heat treatment.

The first manufacturing method preferably further includes a step of forming at least one releasable ink receptive layer (L) on the surface resin layer (A) of the original sheet of the security sticker (1) in advance,
  the releasable ink receptive layer (L)
  being able to display by print,
  having absorption of an ink containing the sublimable dye on a surface side that is not contact with the surface resin layer (A),
  being able to be subjected to heat treatment for sublimating the dye and allowing the dye to penetrate the surface resin layer (A) so as to form an image in the image formation resin layer (K), and
  being able to be released in a state of a film from the surface resin layer (A) after the heat treatment, wherein the dyeing step is a step for obtaining the print layer (B),
  the dyeing step including printing on the ink receptive layer (L) by using the ink containing the dye, and then treating by heat,
  the method still further including a step of releasing the ink receptive layer (L) after the heat treatment.

This is because, in the case of forming an image in the image formation layer according to this manufacturing method, since the process of matching the position of the printed surface of the transfer paper with the position of the surface resin layer (A) can be omitted, the step of printing the image in the ink receptive layer (L) and the step of dyeing by sublimation can be automated, and thus the security sticker can be manufactured simply.

In the second manufacturing method, it is preferable that the dyeing step is a step for obtaining the print layer (B),
  the dyeing step including:
  printing on a transfer paper by using an ink containing the dye so as to form an image on the transfer paper;
  contacting subsequently a surface of the transfer paper on which the image is formed with the surface resin layer (A) of the original sheet of the security sticker (2); and then
  treating by heat,
  the method further including a step of removing the transfer paper after the heat treatment.

The second manufacturing method preferably further includes a step of forming at least one releasable ink receptive layer (L) on the surface resin layer (A) of the original sheet of the security sticker (2) in advance,
  the releasable ink receptive layer (L)
  being able to display by print,
  having absorption of the ink containing the sublimable dye on a surface side that is not contact with the surface resin layer (A),
  being able to be subjected to heat treatment for sublimating the dye and allowing the dye to penetrate the surface resin layer (A) so as to form an image in the image formation resin layer (K), and
  being able to be released in a state of a film from the surface resin layer (A) after the heat treatment,
  wherein the dyeing step is a step for obtaining the print layer (B), including printing on the ink receptive layer (L) by using the ink containing the dye, and then treating by heat,
  the method still further including a step of releasing the ink receptive layer (L) after the heat treatment.

This is because, in the case of forming an image in the image formation layer according to this manufacturing method, since the process of matching the position of the printed surface of the transfer paper with the position of the surface resin layer (A) can be omitted, the step of printing the image in the ink receptive layer (L) and the step of dyeing by sublimation can be automated, and thus the security sticker can be manufactured simply.

In the third manufacturing method, it is preferable that the dyeing step is a step for obtaining the print layer (B),
  the dyeing step including:
  printing on a transfer paper by using an ink containing the dye so as to form an image on the transfer paper;
  contacting subsequently a surface of the transfer paper on which the image is formed with the surface resin layer (A) of the original sheet of the security sticker (3); and then
  treating by heat, the method further including a step of removing the transfer paper after the heat treatment.

The third manufacturing method preferably further includes a step of forming at least one releasable ink receptive layer (L) on the surface resin layer (A) of the original sheet of the security sticker (3) in advance, the releasable ink receptive layer (L)

being able to display by print, having absorption of an ink containing the sublimable dye on a surface side that is not contact with the surface resin layer (A), being able to be subjected to heat treatment for sublimating the dye and allowing the dye to penetrate the surface resin layer (A) so as to form an image in the image formation resin layer (K), and being able to be released in a state of a film from the surface resin layer (A) after the heat treatment, wherein the dyeing step is a step for obtaining the print layer (B), the dyeing step including printing on the ink receptive layer (L) by using the ink containing the dye, and then treating by heat, the method still further including a step of releasing the ink receptive layer (L) after the heat treatment.

This is because, in the case of forming an image in the image formation layer according to this manufacturing method, since the process of matching the position of the printed surface of the transfer paper with the position of the surface resin layer (A) can be omitted, the step of printing the image in the ink receptive layer (L) and the step of dyeing by sublimation can be automated, and thus the security sticker can be manufactured simply.

In the fourth manufacturing method, it is preferable that the dyeing step is a step for obtaining the print layer (13), the dyeing step including:

printing on a transfer paper by using an ink containing the dye so as to form an image on the transfer paper;

contacting subsequently a surface of the transfer paper on which the image is formed with the surface resin layer (A) of the original sheet of the security sticker (4); and then treating by heat, the method further including a step of removing the transfer paper after the heat treatment.

The fourth manufacturing method preferably includes a step of forming at least one releasable ink receptive layer (L) on the surface resin layer (A) of the original sheet of the security sticker (4) in advance, the releasable ink receptive layer (L)

being able to display by print, having absorption of an ink containing the sublimable dye on a surface side that is not contact with the surface resin layer (A), being able to be subjected to heat treatment for sublimating the dye and allowing the dye to penetrate the surface resin layer (A) so as to form an image in the image formation resin layer (K), and being able to be released in a state of a film from the surface resin layer (A) after the heat treatment, wherein the dyeing step is a step for obtaining the print layer (B), the dyeing step including printing on the ink receptive layer (L) by using the ink containing the dye, and then treating by heat, the method still further including a step of releasing the ink receptive layer (L) after the heat treatment.

This is because, in the case of forming an image in the image formation layer according to this manufacturing method, since the process of matching the position of the printed surface of the transfer paper with the position of the surface resin layer (A) can be omitted, the step of printing the image in the ink receptive layer (L) and the step of dyeing by sublimation can be automated, and thus the security sticker can be manufactured simply.

The original sheet of a security sticker (1) of the present invention is an original sheet of a security sticker for the first manufacturing method, including:

a surface resin layer (A) that has a weak affinity with a sublimable dye and allows the dye to penetrate;

an image formation resin layer (K) that contains a low-molecular-weight compound with a molecular weight of 1300 or less in an amount of 0% to 20 wt % inclusive, and has an affinity with the dye;

a self-destructive film layer (C1); and a pressure-sensitive adhesive layer (D1) in this order, wherein the self-destructive film layer (C1) includes at least a dye migration preventive resin layer (E) for preventing migration of the dye and a self-destructive layer (F), and the dye migration preventive resin layer (E) is a resin layer containing a vinyl resin with a glass transition temperature (Tg) of 70° C. or more and a SP value of 9.0 or more as a main component.

The original sheet of a security sticker (2) of the present invention is an original sheet of a security sticker for the second manufacturing method, including:

an image formation resin layer (K) that contains a low-molecular-weight compound with a molecular weight of 1300 or less in an amount of 0% to 20 wt % inclusive, and has an affinity with the sublimable dye;

a self-destructive film layer (C1); and a pressure-sensitive adhesive layer (D1) in this order, wherein the self-destructive film layer (C1) includes at least a dye migration preventive resin layer (E) for preventing migration of the dye and a self-destructive layer (F), and the dye migration preventive resin layer (E) is a biaxially stretched film that is stretched by 10% or more in a winding direction and in a width direction respectively, the film having a shrinkage ratio of 1.0% or less in the winding direction after being heated at 150° C. for 30 minutes.

The original sheet of a security sticker (3) of the present invention is an original sheet of a security sticker for the third manufacturing method, including:

a surface resin layer (A) that has a weak affinity with a sublimable dye and allows the dye to penetrate;

an image formation resin layer (K) that contains a low-molecular-weight compound with a molecular weight of 1300 or less in an amount of 0% to 20 wt % inclusive, and has an affinity with the dye;

the dye migration preventive resin layer (E) that contains a vinyl resin with a glass transition temperature (Tg) of 70° C. or more and a SP value of 9.0 or more, and prevents migration of the dye;

a pressure-sensitive adhesive layer (D2) or an adhesive layer (H); and a releasing member (M) in this order.

The original sheet of a security sticker (4) of the present invention is an original sheet of a security sticker for the fourth manufacturing method, including:

a surface resin layer (A) that has a weak affinity with a sublimable dye and allows the dye to penetrate;

an image formation resin layer (K) that contains a low-molecular-weight compound with a molecular weight of 1300 or less in an amount of 0% to 20 wt % inclusive, and has an affinity with the dye;

the dye migration preventive resin layer (E) which is a biaxially stretched film that is stretched by 10% or more in a winding direction and in a width direction respectively, the film having a shrinkage ratio of 1.0% or less in the winding direction after being heated at 150° C. for 30 minutes;

a pressure-sensitive adhesive layer (D2) or an adhesive layer (H); and a releasing member (M) in this order.

The security sticker of the present invention and a method for manufacturing the same will be described below in detail, by way of embodiments.

Embodiment 1

FIG. 1 is a cross-sectional view showing an example of the first security sticker of the present invention. The security sticker 100 includes a surface resin layer (A)1, a print layer (B)2, a self-destructive film layer (C1)3 and a pressure-sensitive adhesive layer (D1)4 that are laminated in this order. The print layer (B)2 includes a dyeing layer 50 in which a sublimable dye is fixed, and an image is formed in a thickness direction by this dyeing layer 50.

The print layer (B)2 is a layer containing a low-molecular-weight compound that has a molecular weight of 1300 or less, preferably has a molecular weight of 2000 or less, and more preferably has a molecular weight of 3000 or less, in an amount of 0% to 20 wt % inclusive. This is because the low-molecular-weight compound gradually can diffuse the once-fixed sublimable dye, and as a result, a problem occurs such as the deterioration of the sharpness of an edge of the image in the print layer (B)2. In addition, the content of the low-molecular-weight compound in the print layer (B)2 ranges from 0 wt % to 20 wt % inclusive, preferably ranges from 0 wt % to 15 wt % inclusive, and more preferably ranges from 0 wt % to 10 wt % inclusive.

In the print layer (B)2, an additive such as a plasticizer and the like can be contained, but the content thereof is preferably low. The additive gradually diffuses the once-fixed sublimable dye, and as a result, a problem occurs such as the deterioration of the sharpness of an edge of the image in the print layer (B)2.

Moreover, the print layer (B)2 is a layer that has an affinity with the sublimable dye and includes the image formed in the thickness direction of the layer by the dye.

In terms of the protection of the sublimable dye from ultraviolet rays and the like, an ultraviolet absorber that can filter out 70% or more, preferably 80% or more, and more preferably 90% or more of ultraviolet rays preferably is dispersed uniformly and included in the print layer (B)2. Specifically, as a material for the print layer (B)2 satisfying such required properties, a synthetic resin such as an acrylic resin, an alkyd resin, a polyester resin, an urethane resin and an epoxy resin can be used. Among them, a synthetic resin having an affinity with the dye preferably is used. This is because such a synthetic resin can capture the sublimated and diffused sublimable dye with high efficiency and can develop colors with high density. As the material for the print layer (B)2, a resin with heat-resistance more preferably is used. This is because such a resin is not softened considerably nor generates tack (so-called stickiness) at a heating temperature of about 150° C. to about 200° C. during the sublimation dyeing. As the material for the print layer (B)2, a resin that can be cured with radiation further preferably is used. The effective forms of the radiation include electron beams, ultraviolet rays, nuclear radiation, microwave radiation and heat, and materials that can be cured with the radiation are known in the pertinent art.

A dried film thickness of the print layer (B)2 ranges, for example, from about 3 μm to about 100 μm, preferably ranges from about 5 μm to about 80 μm, and more preferably ranges from about 10 μm to about 60 μm.

Figure 2:
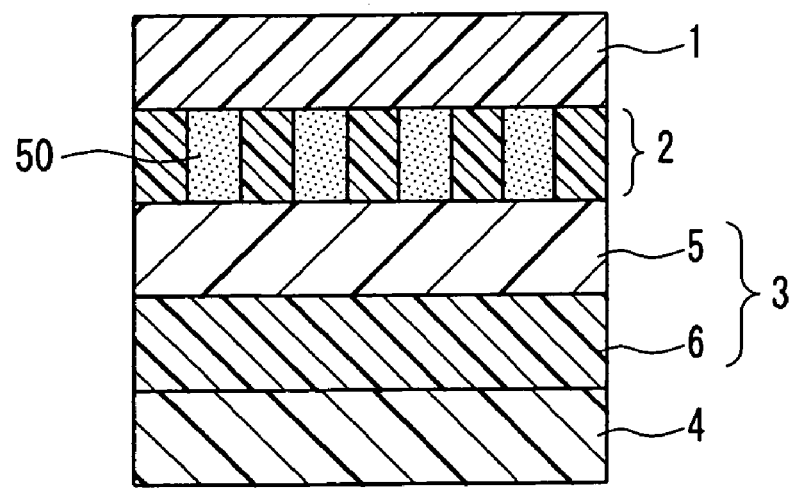
FIG. 2 is a cross-sectional view showing another example of the security sticker of the present invention.
Figure 3:
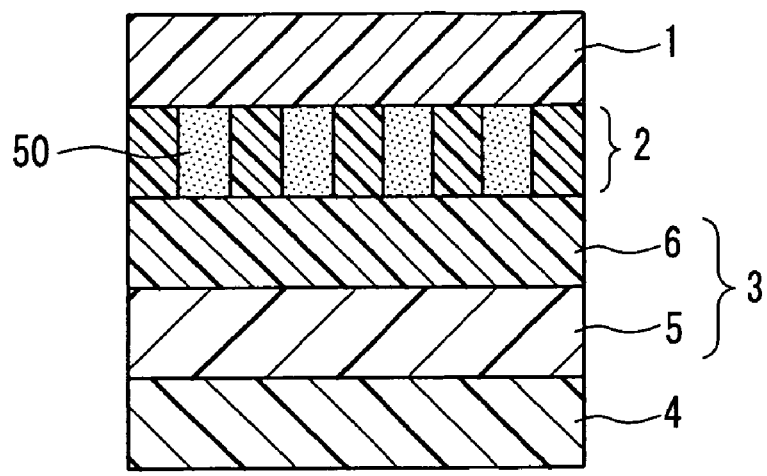
FIG. 3 is a cross-sectional view showing another example of the security sticker of the present invention.

The self-destructive film layer (C1)3 includes the dye migration preventive resin layer (E)5 and the self-destructive layer (F)6, as mentioned above. Either the dye migration preventive resin layer (E)5 or the self-destructive layer (F)6 may face the print layer (B)2 or the pressure-sensitive adhesive layer (D1)4. For example, the dye migration preventive resin layer (E)5 may face the print layer (B)2 (see FIG. 2), or may face the pressure-sensitive adhesive layer (D1)4 (see FIG. 3).

The dye migration preventive resin layer (E)5 is preferably a resin layer containing a vinyl resin with a glass transition temperature (Tg) of 70° C. or more and a SP value (Solubility Parameter) of 9.0 or more as a main component, as mentioned above. This is because such a resin layer can prevent the migration of the sublimable dye. The dye migration preventive resin layer (E)5 preferably is made of a resin containing, in particular, an acrylic resin among the vinyl resins as a main component.

The Tg value is preferably 80° C. or more, and more preferably 90° C. or more. If the Tg value is 70° C. or more, the migration of the sublimable dye can be prevented sufficiently, even at a high temperature such as in midsummer direct sun.

The SP value is preferably 9.25 or more, and more preferably 9.50 or more. The SP value mentioned here is a parameter indicating a polarity of a resin, and a higher SP value indicates a higher polarity of the resin.

The SP value can be measured by a method described below. In the case where the acrylic resin is an acrylic copolymer, the SP value thereof can be estimated by measuring a SP value of a homopolymer of the used acrylic monomer in advance. That is, the SP value of the acrylic copolymer can be estimated from the sum of the values obtained by multiplying the weight fractions of the individual acrylic monomers constituting the copolymer with the SP values of the homopolymers.

For example, actual measurements of SP values of homopolymers of acrylic monomers are as follows: a homopolymer of methyl methacrylate=10.6, a homopolymer of n-butyl methacrylate=8.4, a homopolymer of ethyl methacrylate=9.5, a homopolymer of β-hydroxyethyl methacrylate=11.5, a homopolymer of n-butyl acrylate=8.6.

From the above-described measurement values, a SP value of an acrylic copolymer, for example, a copolymer that contains methyl methacrylate/n-butyl acrylate/β-hydroxyethyl methacrylate=50/40/10 (by a weight ratio) can be estimated to be $(10.6 \times 0.5)+(8.6 \times 0.4)+(11.5 \times 0.1)=9.89$. The estimated SP value of this copolymer of 9.89 is close to the value of 9.92 obtained by the actual measurement that is performed by the following method.

A method for measuring SP values of acrylic resins is as follows:

A resin with a solid content of 0.5 g is weighed in a 100 ml Mayer flask, and 10 ml of tetrahydrofuran (THF) is added thereto so that the resin may be dissolved. The thus obtained solution is kept at a liquid temperature of 25° C., and hexane is dropped using a 50 ml buret while stirring with a magnetic stirrer. Then, the dropped amount $(V_h)$ is determined at the time the solution generates turbidity (a turbid point).

Next, a dropped amount $(V_d)$ is determined separately at a turbid point when deionized water is used instead of hexane.

From the obtained $V_h$ and $V_d$, the SP value $\delta$ of the resin can be obtained using the formula given by UH, CLARKE [J. Polym. Sci. A-1, Vol. 5, 1671-1681(1967)] as follows:

$$\delta=[(V_{mh})^{(1/2)}\delta_{mh}+(V_{md})^{(1/2)}\delta_{md}]/[(V_{mh})^{(1/2)}+(V_{md})^{(1/2)}]$$

where
$V_{mh}=(V_h \cdot V_t)/(\phi_h \cdot V_t + \phi_t \cdot V_h)$,
$V_{md}=(V_d \cdot V_t)/(\phi_d \cdot V_t + \phi_t \cdot V_d)$,
$\delta_{mh}=\phi_h \cdot \delta_h + \phi_t \cdot \delta_t$,
$\delta_{md}=\phi_d \cdot \delta_d + \phi_t \cdot \delta_t$
$\phi_h$, $\phi_d$, $\phi_t$; volume fraction of hexane, deionized water and THF at the turbid point
($\phi_h=V_h/(V_h+10)$, $\phi_d=V_d/(V_d+10)$)
$\delta h$, $\delta d$, $\delta t$; SP values of hexane, deionized water and THF
$V_h$, $V_d$, $V_t$; molecular volumes (ml/mol) of hexane, deionized water and THF.

Examples of vinyl monomers used for manufacturing the acrylic resin include:

aromatic vinyl monomers such as styrene, α-methylstyrene, p-(t-butyl)styrene and vinyltoluene;

(meth)acrylates such as methyl(meth)acrylate, ethyl(meth)acrylate, n-propyl(meth)acrylate, i-propyl(meth)acrylate, n-butyl(meth)acrylate, i-butyl(meth)acrylate, t-butyl(meth)acrylate, 2-ethylhexyl(meth)acrylate, lauryl(meth)acrylate, cyclohexyl(meth)acrylate, benzyl(meth)acrylate, isobornyl (meth)acrylate, dibromopropyl(meth)acrylate, tribromophenyl(meth)acrylate and alkoxyalkyl(meth)acrylate;

diesters of unsaturated dicarboxylic acid, such as maleic acid, fumaric acid and itaconic acid, with monovalent alcohol;

vinyl esters such as vinyl acetate, vinyl benzoate and "VEOVA" (produced by Japan Epoxy Resins Co., Ltd., trade name for vinyl ester);

fluorine-containing polymerizable compounds such as vinyl esters, vinyl ethers, (meth)acrylates and unsaturated polycarboxylic acid esters that contain (per)fluoroalkyl groups, such as "VISKOTE 8F, 8FM, 17FM, 3F or 3FM" (produced by Osaka Organic Chemical Industry Ltd., trade name for a fluorine-containing acrylic monomer), perfluorocyclohexyl(meth)acrylate, di-perfluorocyclohexyl fumarate and N-i-propylperfluorooctanesulfoneamidoethyl(meth)acrylate;

amide bond-containing vinyl monomers such as (meth)acrylamide, dimethyl(meth)acrylamide, N-t-butyl(meth)acrylamide, N-octyl(meth)acrylamide, diacetoneacrylamide, dimethylaminopropylacrylamide and alkoxylated N-methylolated (meth)acrylamide;

various dialkylaminoalkyl(meth)acrylates such as dimethylaminoethyl(meth)acrylate and diethylaminoethyl(meth)acrylate;

carboxyl group-containing vinyl monomers such as (meth)acrylic acid, crotonic acid, maleic acid, fumaric acid and itaconic acid;

hydroxyl group-containing (meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate and 4-hydroxybutyl (meth) acryl ate; and other copolymerizable vinyl monomers such as (meth) acrylonitrile, glycidyl(meth)acrylate, (β-methyl)glycidyl (meth)acrylate, allylglycidylether, vinylethoxysilane, α-methacryloxypropyltrimethoxysilane, trimethylsiloxyethyl(meth) acrylate.

The acrylic resin used as the dye migration preventive resin layer (E)5 can be manufactured using the above-described vinyl monomers by a known polymerization (reaction) method such as a batch type, a semi-batch type and a continuous type solution polymerization method under a normal atmospheric pressure or applied pressure. In this step, known radical generating polymerization catalysts such as azobisisobutyronitrile, benzoyl peroxide, t-butylperoxy benzoate, t-butylperoxy-2-ethyl hexanoate, t-butyl hydroperoxide, di-t-butyl peroxide and cumene hydroperoxide can be used alone or as a mixture of several types according to the polymerization condition.

A solvent to be used in the solution polymerization method may be selected as appropriate from aromatic hydrocarbons such as toluene and xylene, and solvents such as ester solvents, ketone solvents and alcohol solvents.

An example of the manufacture of the acrylic resin with SP values of 9.0 or more will be described below.

Reference Example 1

1000 parts of n-butyl acetate was put in a four-necked flask equipped with a stirrer, a thermometer, an inert-gas inlet and a condenser, and then a temperature was increased to 110° C. Next, a mixture containing: 650 parts of methyl methacrylate; 245 parts of n-butyl methacrylate; 100 parts of 2-hydroxyethyl methacrylate; 5 parts of methacrylic acid; and 15 parts of t-butylperoxy-2-ethyl hexanoate was dropped at 110° C. over the course of 4 hours. After the dropping, the temperature was kept at 110° C. so as to continue the reaction for 6 hours, thereby obtaining an acrylic copolymer (a-1) with a nonvolatile content of about 50%. After the thus obtained acrylic copolymer (a-1) was dried, its SP value was measured, which was 10.16.

Reference Examples 2 to 6

Acrylic copolymers (a-2) to (a-6) were obtained in the same manner as Reference Example 1 except that the ratio of the vinyl monomers was changed to the ratios as shown in Table 1. In addition, their SP values measured after the drying are shown in Table 1.

TABLE 1

| Vinyl monomers (parts) | a-2 | a-3 | a-4 | a-5 | a-6 |
|---|---|---|---|---|---|
| styrene | 100 | 200 | — | 200 | — |
| methyl methacrylate | 200 | 500 | 800 | — | 400 |
| ethyl methacrylate | 200 | — | — | 450 | — |
| ethyl acrylate | — | — | 190 | — | 100 |
| n-butyl methacrylate | 100 | 200 | — | — | 300 |
| t-butyl methacrylate | — | — | — | 200 | — |
| n-butyl acrylate | 195 | 95 | — | 150 | 190 |
| 2-hydroxyethyl methacrylate | 200 | — | — | — | — |

TABLE 1-continued

| Vinyl monomers (parts) | a-2 | a-3 | a-4 | a-5 | a-6 |
|---|---|---|---|---|---|
| methacrylic acid | 5 | 5 | 10 | — | 10 |
| S P values | 9.79 | 9.64 | 10.49 | 9.02 | 9.54 |

It is preferable to use, as the dye migration preventive resin layer (E)5, a resin containing such acrylic resins as main components in an uncured state, or a three-dimensionally structured polymer that is obtained by crosslinking an acrylic resin having a reactive functional group with a curable material that reacts with this reactive functional group, because the migration of the sublimable dye can be prevented.

The dye migration preventive resin layer (E)5 may contain an additive arbitrarily.

A dried film thickness of the dye migration preventive resin layer (E)5 ranges, for example, from about 1 μm to about 100 μm, preferably ranges from about 2 μm to about 80 μm, and more preferably ranges from about 3 μm to about 60 μm.

As mentioned above, the self-destructive layer (F)6 is preferably a film including a hologram or a diffraction grating with a predetermined pattern, a self-destructive film obtained by subjecting a fragile film or a supporting film to a regular or irregular releasing treatment, or the like.

Examples of a resin for forming the fragile film include: thermoplastic resins with a relatively low degree of polymerization of polyvinyl alcohol, an acrylic resin, polystyrene, polyvinyl chloride, a nitrocellulose resin, an acetyl cellulose resin, a cellulose acetate butyrate resin, and a vinyl chloride-vinyl acetate copolymer; transparent ultraviolet curable polymer resins of these resin complex systems; transparent electron beam curable polymer resins of these resin complex systems; transparent thermosetting polymer resins with a low degree of polymerization of unsaturated polyester, urethane and epoxy; ultraviolet curable monomer resins of these resin complex systems; electron beam curable monomer resins of these resin complex systems; a polyester or urethane thermosetting monomer resin; a silicone resin; a paraffin wax; and transparent varnishes based on drying oils such as a linseed oil.

Examples of the supporting film include a polyester film, a polycarbonate film, an acrylic resin film and a cellulose resin film.

Examples of a releasing treatment agent include a silicone resin, a fluororesin, an acrylic resin, an alkyd resin, a chlorinated rubber-based resin, a vinyl chloride-vinyl acetate copolymer, a cellulose resin, a chlorinated polypropylene resin, and these resins with oil silicone, aliphatic acid amide, zinc stearate or the like added thereto. Moreover, inorganic materials also may be used.

Either the dye migration preventive resin layer (E)5 or the self-destructive layer (F)6 may face the print layer (B)2 or the pressure-sensitive adhesive layer (D1)4.

The self-destructive layer (F) is preferably a film obtained by subjecting a fragile film or a supporting film to a regular or irregular releasing treatment or a film including a hologram or a diffraction grating, as mentioned above, and more preferably, a transparent hologram or a transparent diffraction grating is used. In these films, total visible light transmittance is preferably 50% or more, and is more preferably 60% or more. The total visible light transmittance of 50% or more is preferable, because an image can be identified visually more clearly. As the hologram, either a planar hologram or a volume hologram may be used. In the case of using the planer hologram, a relief hologram is preferable in the light of mass-production, durability and cost, and in the case of using the volume hologram, a Lippmann hologram is preferable in the light of image reproducibility and mass-production. Besides them, laser reproduction holograms such as a Fresnel hologram, a Fraunhofer hologram, a lensless Fourier-transform hologram and an image hologram, a white light reproduction hologram such as a rainbow hologram, a color hologram, a computer hologram, a hologram display, a multiplex hologram and a holographic stereogram to which mechanisms of the laser reproduction hologram and the white light reproduction hologram are applied can be used.

In addition, as the diffraction grating, a holographic diffraction grating, a diffraction grating that is formed mechanically with an electron beam painting apparatus or the like can be used.

The surface resin layer (A)1 has a weak affinity with the sublimable dye, and allows the dye to penetrate. Examples of a material for such a surface resin layer (A)1 include olefin resins, i.e., polyethylene, polypropylene and the like, vinyl alcohol resins, i.e., polyvinyl alcohol and an ethylene-vinyl alcohol copolymer resin and the like, a fluororesin, a silicon resin and a mixture of them. Among them, as the material for the surface resin layer (A)1, a synthetic resin that contains a fluororesin or a silicon denatured acrylic resin as a main component is preferable. This is because they have high ultraviolet-resistance and a high non-affinity with the dye.

The surface resin layer (A)1 arbitrarily may include an additive and the like. In addition, a dried film thickness of the surface resin layer (A)1 ranges, for example, from about 1 μm to about 80 μm, preferably ranges from about 2 μm to about 60 μm, and more preferably ranges from about 3 μm to about 40 μm.

Examples of the synthetic resin containing the fluororesin as a main component include: fluoroolefin copolymers such as tetrafluoroethylene-perfluoroalkylvinylether copolymer, tetrafluoroethylene-hexafluoropropylene copolymer, tetrafluoroethylene-hexafluoropropylene-perfluoroalkylvinylether copolymer, tetrafluoroethylene-ethylene copolymer and chlorotrifluoroethylene-ethylene copolymer; and fluororesins such as polychlorotrifluoroethylene, polytetrafluoroethylene, polyvinylidene fluoride and polyvinyl fluoride.

The surface resin layer (A) is manufactured using the synthetic resin containing the fluororesin as a main component preferably by, for example, a method of forming a fluororesin made of a fluoroolefin copolymer that is soluble in a solvent into a film by a processing method such as a solvent casting method (a casting method) or the like. A more preferable method for manufacturing the surface resin layer (A) is forming it into a film by a reaction of a fluoroolefin copolymer that is soluble in a solvent having a reactive functional group with a hardener that react with this reactive functional group and/or a catalytic hardener.

Specific examples of the synthetic resin containing the silicon denatured acrylic resin as a main component will be described below:

(1) a cured film obtained by adding a hydrolytic catalyst to a vinyl copolymer that is obtained by copolymerizing vinyl monomers having hydrolyzable silyl groups;

(2) a cured film obtained by adding a compound having both an epoxy group and a hydrolyzable silyl group in one molecule to a vinyl copolymer that is obtained by copolymerizing vinyl monomers having amino groups and/or carboxyl groups;

(3) a cured film obtained by adding a polyisocyanate compound to a vinyl copolymer having a hydroxyl group that is obtained by graft-polymerizing a silicon resin; and (4) a cured film obtained by adding a hydrolytic catalyst to a vinyl copolymer having a hydrolyzable silyl group that is obtained by graft-polymerizing a silicon resin.

The surface resin layer (A) is preferably a white resin layer. It is preferable to form a white resin layer by using a white pigment, because a transmittance density of the printed image can be enhanced. The white pigment used for forming the surface resin layer (A) to be a white resin layer may be any one that is used generally for coloring a synthetic resin in white. Specific examples thereof include titanium oxide, hydrozincite, white lead, barium sulfate, zinc sulfide, antimony oxide, specific titanates represented by $MTiO_3$ (M denotes at least one element selected from the group consisting of Mg, Ca, Sr and Ba) and the like.

In addition, since the surface resin layer (A) is an outermost layer of the security sticker of the present invention, and is positioned on an outer side of the print layer (B), it can protect the dye for forming the image in the print layer (B) from ultraviolet rays, glass cleaner, water and the like, thus enhancing the durability.

Examples of additives contained in the surface resin layer (A), the print layer (B) and the dye migration preventive resin layer (E) include an ultraviolet absorber, a light stabilizer, and an antioxidant. They may be used alone or in combination of two kinds or more. By containing these additives, the durability of the surface resin layer (A), the print layer (B) and the dye migration preventive resin layer (E) can be enhanced more.

As the ultraviolet absorber, known ultraviolet absorbers can be used, for example, benzophenones, benzotriazoles, cyanoacrylates, salicylates and anilide oxalates and the like can be used. As the light stabilizer, known light stabilizers can be used, for example, a hindered amine compound and the like can be used. As the antioxidant, for example, a hindered phenol compound, an amine antioxidant, a sulfur antioxidant and the like can be used.

In addition, the additives contained in the surface resin layer (A), the print layer (B) and the dye migration preventive resin layer (E) preferably have high-molecular weights. The use of the additives such as the ultraviolet absorber, the light stabilizer and the antioxidant with high-molecular weights can suppress problems such as the occurrence of phase caused by phase separation from the surface resin layer (A), bleed-out and a phenomenon of volatilizing the additive from the surface resin layer (A) side during the heat treatment performed.

In addition, the sublimable dye used in the present invention is preferably a dye that is sublimated or vaporized under an atmospheric pressure and at a temperature ranging from 70° C. to 260° C. Examples of such a sublimable dye include dyes and basic dyes such as azo compounds, anthraquinones, quinophthalones, styryls, diphenylmethanes, triphenylmethanes, oxazins, triazines, xanthenes, methine compounds, azomethines, acridines and diazines. Among them, as the dye, 1,4-dimethylaminoanthraquinone, brominated or chlorinated 1,5-dihydroxy-4,8-diamino-anthraquinone, 1,4-diamino-2,3-dichloro-anthraquinone, 1-amino-4-hydroxy-anthraquinone, 1-amino-4-hydroxy-2-(β-methoxyethoxy) anthraquinone, 1-amino-4-hydroxy-2-phenoxyanthraquinone, methylester, ethylester, propylester and butylester of 1,4-diaminoanthraquinone-2-carboxylic acid, 1,4-diamino-2-methoxyanthraquinone, 1-amino-4-aniinoanthraquinone, 1-amino-2-cyano-4-anilino (or cyclohexylamino) anthraquinone, 1-hydroxy-2(p-acetaminophenylazo)-4-methylbenzene, 3-methyl-4-(nitrophenylazo) pyrazolone, 3-hydroxyquinophthalone and the like are preferable.

As the basic dye, for example, malachite green, methyl violet and the like can be used. Among them, the basic dye is preferably a dye that is denatured with sodium acetate, sodium ethylate, sodium methylate or the like.

The pressure-sensitive adhesive layer (D1) can be manufactured by using a general pressure-sensitive adhesive. A thickness thereof is not particularly limited.

As the pressure-sensitive adhesive, acrylic pressure-sensitive adhesives including an acrylic ester copolymer, silicone pressure-sensitive adhesives including a silicone rubber and a silicone resin, and rubber-based pressure-sensitive adhesives including a natural rubber or a synthetic resin can be applied. The rubber-based pressure-sensitive adhesive contains three components: a natural rubber, a synthetic rubber or a reclaimed rubber as a main component; a tackifier; and an antioxidant, to which various materials such as a softener, a crosslinking agent and a filler can be selected to be added as necessary. As the acrylic pressure-sensitive adhesive, a solvent type, an emulsion type, a water-based type that is a water-soluble type, a hot-melt type and a solventless type that is a liquid-curable type can be used. Among them, the solvent type is preferable because it has excellent weather-resistance and heat-aging-resistance, and can maintain permanent adhesion with long-term reliablity or a rereleasable function. It is more preferable to use a base polymer that incorporates a monomer having a functional group for enhancing heat-resistance, solvent-resistance and plasticizer-migration-resistance, with a crosslinking agent that reacts with the functional group. Examples of the acrylic monomer having a functional group include hydroxyethyl acrylate, hydroxyethyl methacrylate, hydroxypropyl methacrylate, acrylic acid, methacrylic acid, itaconic acid, maleic anhydride, glycidyl acrylate, glycidyl methacrylate, N-methylolacrylamide, N-methylolmethacrylamide, dimethylaminoethyl methacrylate and t-butylaminoethyl methacrylate, and examples of the crosslinking agent include a melamine resin, an urea resin, polyisocyanate, an epoxy resin, a metal chelate, a —COOH-containing polymer, an acid anhydride and polyamine, but when the sublimable dye penetrates the image formation resin layer (K) by heating, thermal-discoloration-resistant suitability is required. In addition, for suppressing the generation of a toxic material such as formaldehyde and an irritant component during the heating, a hardener such as an epoxy resin, a metal chelate and an aliphatic polyisocyanate more preferably is applied. Moreover, a tackifier may be used as necessary for the purpose of adding adherability to an adhesive at a low temperature or polyolefin. Furthermore, the silicone pressure-sensitive adhesive preferably is applied in the case where heat-resistance or low-temperature-resistance is required particularly.

Figure 4:
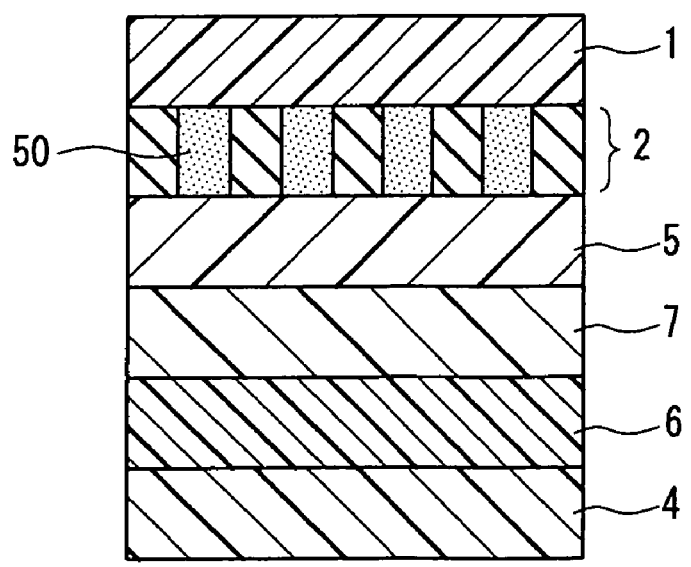
FIG. 4 is a cross-sectional view showing another example of the security sticker of the present invention.

As mentioned above, the flexible resin layer (G)7 having an elongation percentage larger than that of the dye migration preventive resin layer (E)5 preferably is included between the dye migration preventive resin layer (E)5 and the pressure-sensitive adhesive layer (D1)4 (see FIG. 4).

As a material for the flexible resin layer (G)7, specifically, synthetic resins such as an urethane resin, a vinyl resin, an acrylic resin, an alkyd resin, a polyester resin, an epoxy resin, a fluororesin, an olefin resin, a silicon resin and the like can be used. In addition, a dried film thickness of the flexible resin layer (G)7 preferably is set to be in a range, for example, from 1 µm to 100 µm inclusive, preferably from 3 µm to 80 µm inclusive, and more preferably from 5 µm to 60 µm inclusive. The film thickness of 1 µm or more is sufficient for preventing the dye migration preventive resin layer (E) from breaking, which can be caused by its following the elongation of the security sticker during its stretching. Whereas, the film thickness of 100 µm or less is preferable, because the overall film thickness of the security sticker is not too large, which does not degrade the capability to follow the curved surface when being attached to the object. Moreover, it can prevent the self-destructive layer (F)6 including the predetermined pattern from being destroyed.

Embodiment 2

Next, another example of the security sticker of the present invention will be described.

Figure 5:
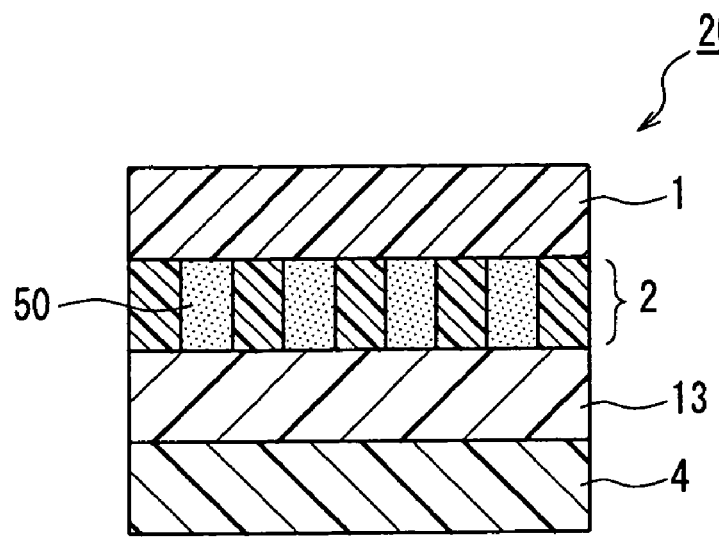
FIG. 5 is a cross-sectional view showing another example of the security sticker of the present invention.

FIG. 5 is a cross-sectional view showing an example of the second security sticker of the present invention. A security sticker 200 includes a surface resin layer (A)1, a print layer (B)2, a self-destructive film layer (C1)13 and a pressure-sensitive adhesive layer (D1)4 that are laminated in this order.

The surface resin layer (A)1, the print layer (B)2 and the pressure-sensitive adhesive layer (D1)4 are the same as the surface resin layer (A)1, the print layer (B)2 and the pressure-sensitive adhesive layer (D1)4 in Embodiment 1, respectively.

Figure 6:
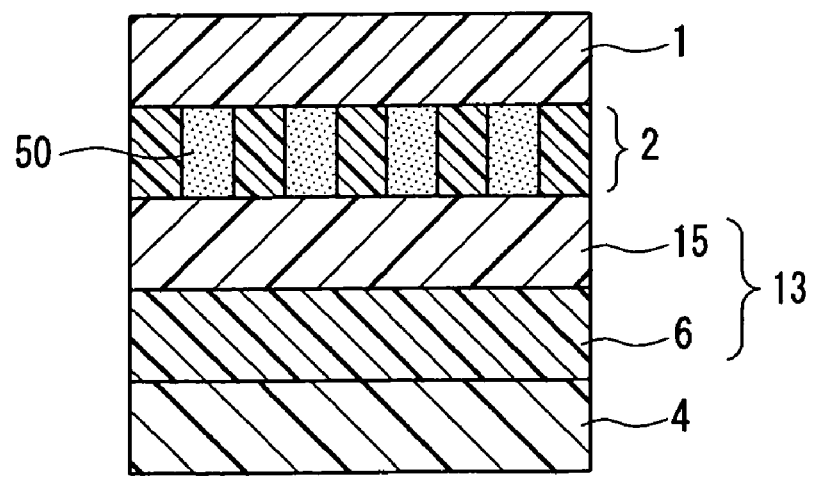
FIG. 6 is a cross-sectional view showing another example of the security sticker of the present invention.
Figure 7:
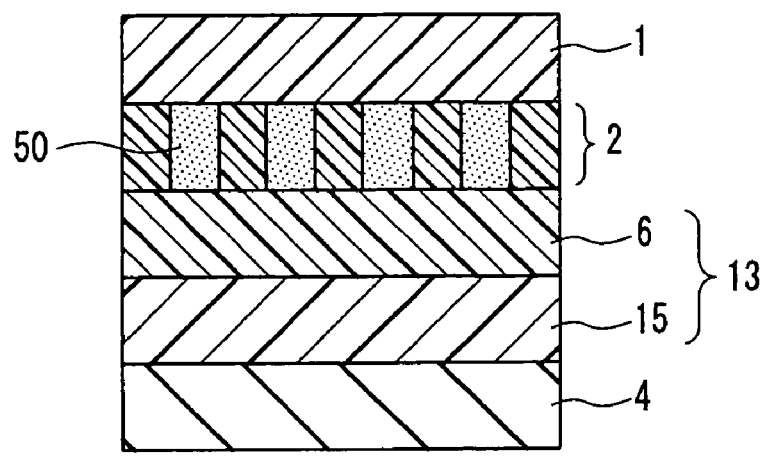
FIG. 7 is a cross-sectional view showing another example of the security sticker of the present invention.

The self-destructive film layer (C1)13 includes a dye migration preventive resin layer (E)15 and a self-destructive layer (F)6, as mentioned above. Either the dye migration preventive resin layer (E)15 and the self-destructive layer (F)6 may face the print layer (B)2 or the pressure-sensitive adhesive layer (D1)4. For example, the dye migration preventive resin layer (E)15 may face the print layer (B)2 (see FIG. 6), or may face the pressure-sensitive adhesive layer (D1)4 (see FIG. 7). The self-destructive layer (F)6 is the same as the self-destructive layer (F)6 in Embodiment 1.

The dye migration preventive resin layer (E) 15 is a biaxially stretched film that is stretched by 10% or more in a winding direction and in a width direction respectively, the film having a shrinkage ratio of 1.0% or less in the winding direction after being heated at 150° C. for 30 minutes. The elongation percentage of the biaxially stretched film preferably is 50% or more, more preferably 100% or more, and still more preferably 200% or more. The elongation percentage of 10% or more can prevent the migration of the sublimable dye sufficiently. In addition, the biaxially stretched film preferably is annealed at a temperature of the glass transition temperature or more, while being fixed in length or relaxed by the applied heat. This is intended to suppress the occurrence of wrinkles and streaks that are caused by the shrinkage of the biaxially stretched film during the heating. The shrinkage ratio is preferably 0.8% or less, and more preferably 0.6% or less. The shrinkage ratio of 1.0% or less can suppress the occurrence of such wrinkles and streaks that are caused by the shrinkage of the biaxially stretched film during the heating. The biaxially stretched film is particularly preferably a polyester film.

The dye migration preventive resin layer (E)15 may include an additive arbitrarily.

Embodiment 3

Next, another example of the security sticker of the present invention will be described.

Figure 8:
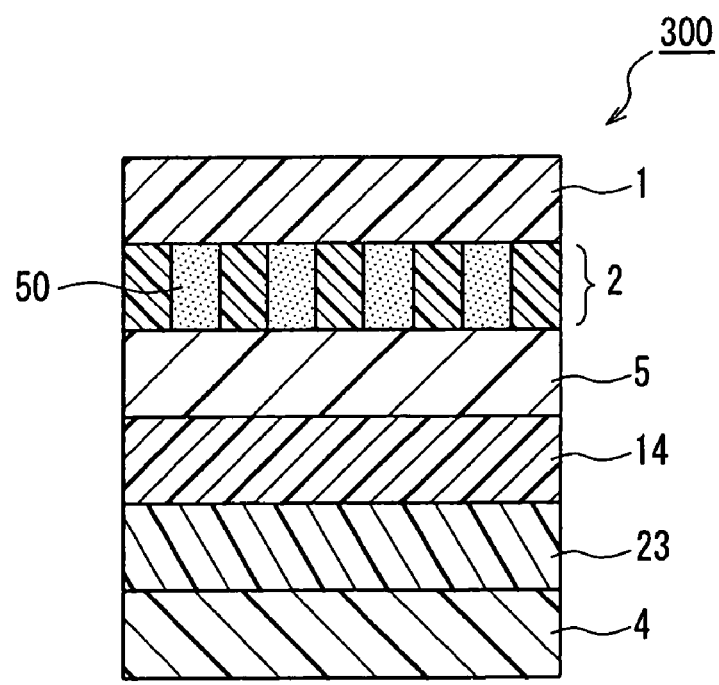
FIG. 8 is a cross-sectional view showing another example of the security sticker of the present invention.

FIG. 8 is a cross-sectional view showing an example of the third security sticker of the present invention. A security sticker 300 includes a surface resin layer (A)1, a print layer (B)2, a dye migration preventive resin layer (E)5, a pressure-sensitive adhesive layer (D2) or an adhesive layer (H)14, a self-destructive film layer (C2)23 and a pressure-sensitive adhesive layer (D1)4 that are laminated in this order.

The surface resin layer (A)1, the print layer (B)2, the dye migration preventive resin layer (E)5 and the pressure-sensitive adhesive layer (D1)4 are the same as the surface resin layer (A)1, the print layer (B)2, the dye migration preventive resin layer (E)5 and the pressure-sensitive adhesive layer (D1)4 in Embodiment 1.

Figure 9:
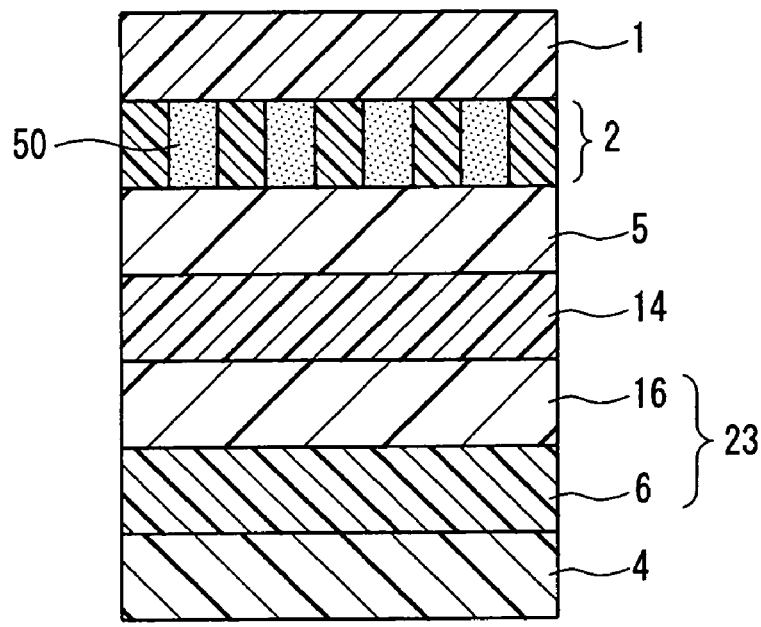
FIG. 9 is a cross-sectional view showing another example of the security sticker of the present invention.
Figure 10:
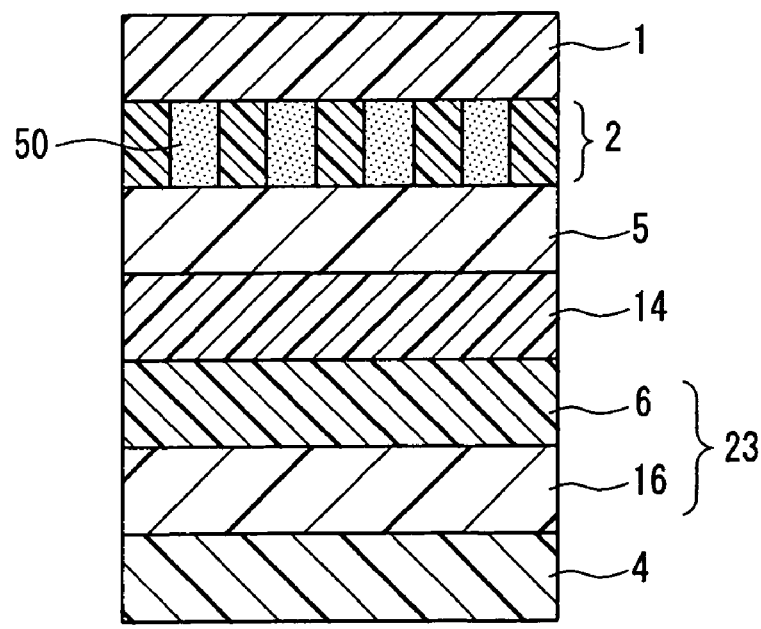
FIG. 10 is a cross-sectional view showing another example of the security sticker of the present invention.

A self-destructive film layer (C2)23 includes a self-destructive layer (F)6 and a supporting layer (J)16, as mentioned above. Either the supporting layer (J)16 or the self-destructive layer (F)6 may face the pressure-sensitive adhesive layer (D1)4. For example, the supporting layer (J)16 may face the pressure-sensitive adhesive layer (D1)4 (see FIG. 9), alternatively, the self-destructive layer (F)6 may face the pressure-sensitive adhesive layer (D1)4 (see FIG. 10). The self-destructive layer (F)6 is the same as the self-destructive layer (F)6 in Embodiment 1.

The supporting layer (J) 16 is not limited particularly, as long as it can support the self-destructive layer (F)6, but for example, the biaxially stretched film described for the dye migration preventive resin layer (E)15 may be used, and it can be manufactured similarly by using a vinyl resin, an acrylic resin, an alkyd resin, a polyurethane resin or the like.

The pressure-sensitive adhesive layer (D2) can be manufactured using the same materials as those of the pressure-sensitive adhesive layer (D1) in the same manner thereof.

The adhesive layer (H) can be manufactured using a general adhesive. The thickness thereof also is not limited particularly.

Embodiment 4

Next, another example of the security sticker of the present invention will be described below.

Figure 11:
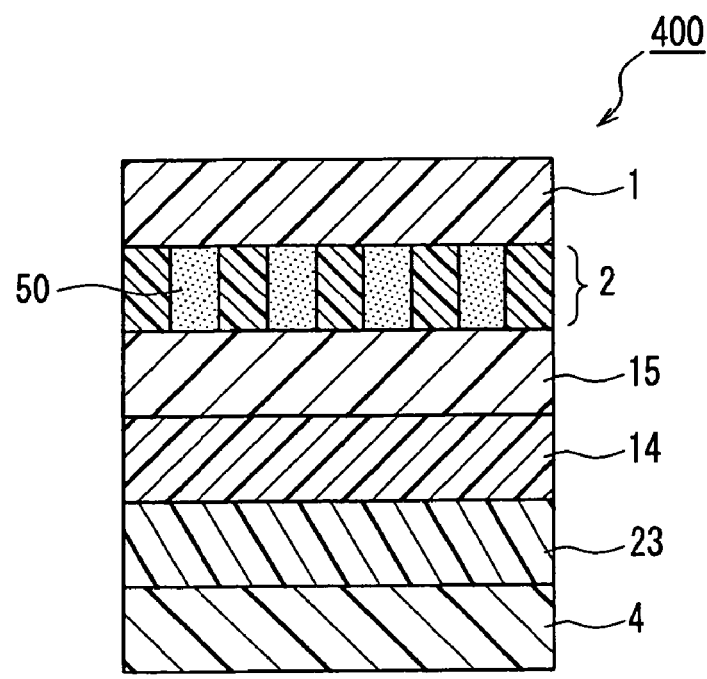
FIG. 11 is a cross-sectional view showing another example of the security sticker of the present invention.

FIG. 11 is a cross-sectional view showing an example of the fourth security sticker of the present invention. A security sticker 400 includes a surface resin layer (A)1, a print layer (B)2, a dye migration preventive resin layer (E)15, a pressure-sensitive adhesive layer (D2) or an adhesive layer (H)14, a self-destructive film layer (C2)23 and a pressure-sensitive adhesive layer (D1)4 that are laminated in this order.

The surface resin layer (A)1, the print layer (B)2, the pressure-sensitive adhesive layer (D2) or the adhesive layer (H)14, the self-destructive film layer (C2)23 and the pressure-sensitive adhesive layer (D1)4 are the same as the surface resin layer (A)1, the print layer (B)2, the pressure-sensitive adhesive layer (D2) or the adhesive layer (H)14, the self-destructive film layer (C2)23 and the pressure-sensitive adhesive layer (D1)4 in Embodiment 3. The dye migration preventive resin layer (E)15 is the same as the dye migration preventive resin layer (E) 15 in Embodiment 2.

Figure 12:
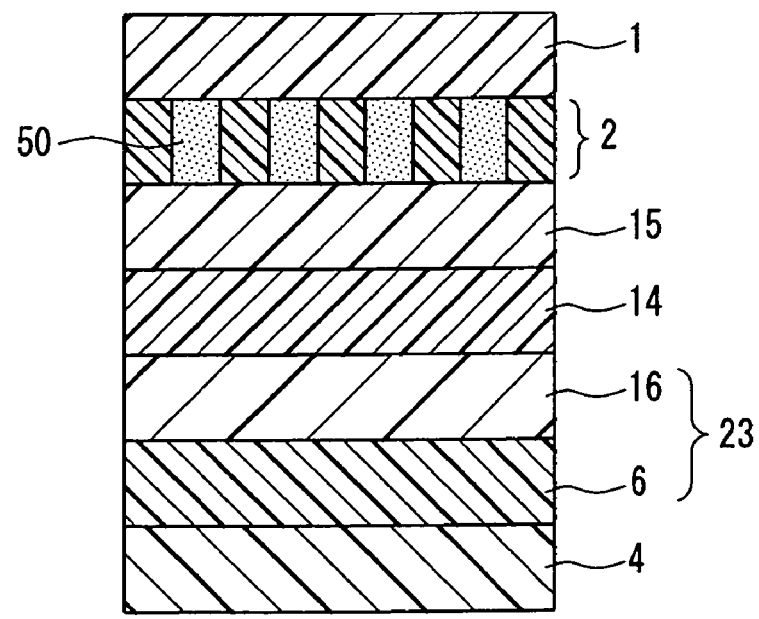
FIG. 12 is a cross-sectional view showing another example of the security sticker of the present invention.
Figure 13:
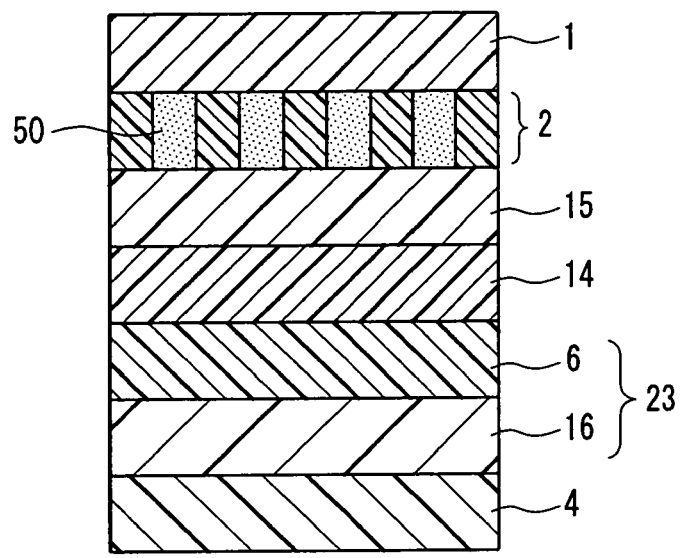
FIG. 13 is a cross-sectional view showing another example of the security sticker of the present invention.

A self-destructive film layer (C2)23 includes a self-destructive layer (F)6 and a supporting layer (J)16, as mentioned above. Either the supporting layer (J) 16 or the self-destructive layer (F)6 may face the pressure-sensitive adhesive layer (D1)4. For example, the supporting layer (J)16 may face the pressure-sensitive adhesive layer (D1)4 (see FIG. 13), alternatively, the self-destructive layer (F)6 may face the pressure-sensitive adhesive layer (D1)4 (see FIG. 12). The self-destructive layer (F)6 is the same as the self-destructive layer (F)6 in Embodiment 1.

Figure 14:
FIG. 14 is a view showing another example of the security sticker of the present invention in which an image is formed.

As the images included in the first, second, third and fourth security stickers, a number plate, an issue date, a national flag (a public emblem such as a prefecture emblem and a state emblem), a photo image of a vehicle, vehicle information such as a bar code corresponding to a part or all of the above-described vehicle information, individual information such as ownership and a symbol mark printed faintly on the security sticker all over the face are exemplified (see FIG. 14). By printing these images in combination, the counterfeit-preventing function of the security sticker of the present invention can be enhanced further.

In addition, in the case where a higher function of security is required, an IC unit in which a larger amount of information can be input can be used. In this case, the IC unit may be laminated on a surface of the surface resin layer (A)1 via a pressure-sensitive adhesive layer or an adhesive layer. Moreover, it is more preferable to attach a fragile film further on the IC unit via a pressure-sensitive adhesive layer or an adhesive layer, because the IC unit cannot be reattached, which further enhances the counterfeit-preventing function. Furthermore, it is preferable to reserve a space for attaching the IC unit on the surface resin layer (A)1, and not to form an image in a part of the print layer (B)2 under to the thus reserved space. This is because, if an image is formed in the part of the print layer (B)2 under the space where the IC unit is attached, the sublimable dye penetrates the surface resin layer (A)1 over the course of time and migrates into the pressure-sensitive adhesive layer of the IC unit, which may cause the occurrence of a blurry edge of the image and deterioration of sharpness of the image.

The IC unit is, for example, a non-contact-type and proximity-type IC unit, and is, for example, provided with a CPU: a central processing unit, a RAM: a high-speed memory for general data, a ROM: a read-only memory for storing programs, an EEPROM: a read-only memory used for storing data, an interface: a means of controlling communication between an IC card and an outside, a co-processor: a processor specifically for executing data of a RSA at a high speed, and an antenna coil for connecting them.

Embodiment 5

Next, an example of the method for manufacturing the security sticker of the present invention will be described.

Figure 15:
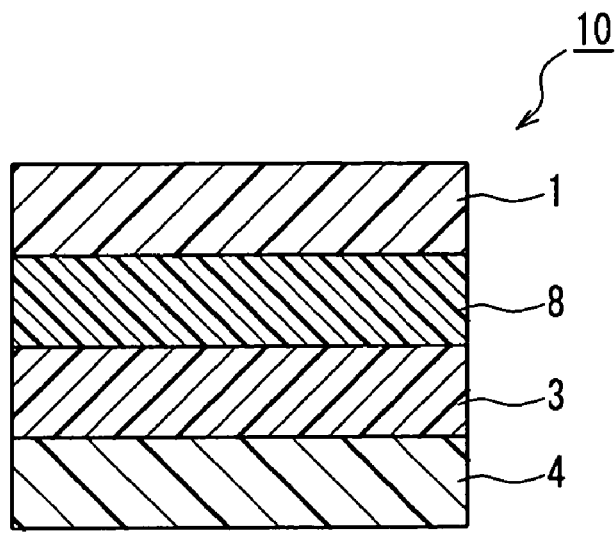
FIG. 15 is a cross-sectional view showing an example of the original sheet of the security sticker of the present invention.
Figure 16:
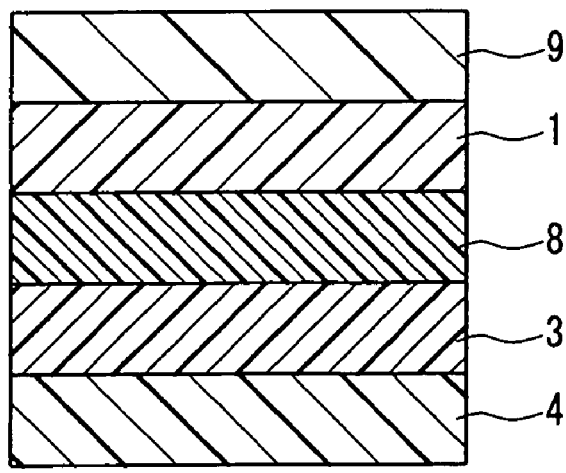
FIG. 16 is a cross-sectional view showing another example of the original sheet of the security sticker of the present invention.

FIGS. 15 and 16 are cross-sectional views showing an original sheet of a security sticker and an original sheet of a security sticker further including a releasable ink receptive layer (L), for explaining an example of the first method for manufacturing the security sticker of the present invention. In FIG. 15, the original sheet of the security sticker (1)10 includes a surface resin layer (A)1, an image formation resin layer (K)8, a self-destructive film layer (C1)3 and a pressure-sensitive adhesive layer (D1)4 that are laminated in this order. In FIG. 16, the releasable ink receptive layer (L)9 is laminated on the surface resin layer (A)1 of the original sheet of the security sticker (1)10.

As mentioned above, the first method for manufacturing the security sticker includes
    a dyeing step of heat-treating an original sheet of a security sticker (1) for obtaining a print layer (B),
    the original sheet of the security sticker (1) including:
        a surface resin layer (A)1 that has a weak affinity with a sublimable dye and allows the dye to penetrate;
        an image formation resin layer (K)8 that contains a low-molecular-weight compound with a molecular weight of 1300 or less in an amount of 0% to 20 wt % inclusive, and has an affinity with the dye;
        a self-destructive film layer (C1)3; and
        a pressure-sensitive adhesive layer (D1)4 in this order,
    wherein the self-destructive film layer (C1)3 includes at least a dye migration preventive resin layer (E) for preventing migration of the dye and a self-destructive layer (F), and
    the dye migration preventive resin layer (E) is a resin layer containing a vinyl resin with a glass transition temperature (Tg) of 70° C. or more and a SP value of 9.0 or more as a main component,
so as to sublimate the dye from the surface resin layer (A) side, allow the dye to penetrate the surface resin layer (A), introduce the dye into the image formation resin layer (K), and form an image in the image formation resin layer (K) in a thickness direction of the image formation resin layer (K).

The image formation resin layer (K)8 has the same configuration as the print layer (B)2 except that the image is not formed in the thickness direction of the layer by the sublimable dye.

It is preferable that the dyeing step is a step for obtaining the print layer (B),
    the dyeing step including:
        printing on a transfer paper by using an ink containing the dye so as to form an image on the transfer paper;
        contacting subsequently a surface of the transfer paper on which the image is formed with the surface resin layer (A) of the original sheet of the security sticker (1); and then treating by heat,
    the method further including a step of removing the transfer paper after the heat treatment.

Examples of a method for printing on the transfer paper by using an ink containing the sublimable dye include an electrophotography method, an electrostatic recording method, an ink jet method and a thermal transfer method.

As the transfer paper, a commercially available sublimable transfer paper, a printing paper for ink jet and the like can be used.

As a method for the heat treatment, for example, a method of heating at about 100° C. to about 200° C. for several tens of seconds to several minutes using a heat vacuum applicator, an oven drier, a far infrared heating apparatus and the like can be used. By the heating, the dye is sublimated from the transfer paper, penetrates the surface resin layer (A)1, migrates into the image formation resin layer (K)8, and is diffused for dyeing in the image formation resin layer (K)8, thereby forming the image. Thus, the image can be formed in the thickness direction of the image formation resin layer (K)8.

As mentioned above, the first manufacturing method preferably further includes a step of forming at least one releasable ink receptive layer (L)9 on the surface resin layer (A)1 of the original sheet of the security sticker (1)10 in advance,
    the releasable ink receptive layer (L)9
    being able to display by print,
    having absorption of an ink containing the sublimable dye on a surface side that is not contact with the surface resin layer (A)1,
    being able to be subjected to heat treatment for sublimating the dye and allowing the dye to penetrate the surface resin layer (A)1 so as to form an image in the image formation resin layer (K)8, and
    being able to be released in a state of a film from the surface resin layer (A)1 after the heat treatment,
    wherein the dyeing step is a step for obtaining the print layer (B),
    the dyeing step including printing on the ink receptive layer (L)9 by using the ink containing the dye, and then treating by heat,
    the method still further including a step of releasing the ink receptive layer (L) after the heat treatment.

The releasable ink receptive layer (L)9 may be manufactured from a hydrophilic resin, for example. Examples of the hydrophilic resin include a polyurethane resin, an acrylic resin, a fluororesin, non-denatured or denatured polyvinyl alcohol, a polyester resin, an acrylic urethane resin, a vinyl acetate resin, a maleic anhydride copolymer, a sodium salt of alkyl ester, gelatin, albumin, casein, starch, SBR latex, NBR latex, a cellulose resin, an amide resin, a melamine resin, polyacrylamide and polyvinyl pyrrolidone. These materials also may be cationic-denatured or may include hydrophilic groups added thereto. They may be used alone or in combination of two kinds or more.

To the releasable ink receptive layer (L)9, a filler such as silica, clay, talc, diatomaceous earth, zeolite, calcium carbonate, alumina, zinc oxide and titanium may be added.

Examples of a method for printing on the ink receptive layer (L)9 formed on the surface resin layer (A)1 of the original sheet of the security sticker (1)10 by using the ink containing the sublimable dye include heat transfer printing, electrostatic printing, gravure printing and an ink jet printing method. Among them, an ink jet printing method is preferable as the printing method. This is because it can facilitate full color printing. In particular, an on-demand-type ink jet method is preferable, because it is economical in terms of usage efficiency of the ink.

As the method for the heat treatment, for example, a method of heating at about 100° C. to about 200° C. for several tens of seconds to several minutes by using a heat vacuum applicator, an oven drier, a far infrared heating apparatus and the like can be used. The heating temperature more preferably ranges 150° C. to 200° C. This is because the temperature in such a range can enhance the capability for carrying out the sublimation of the sublimable dye in a shorter period of time effectively without causing significant thermal damage to the self-destructive layer (F)6 and the like. Moreover, it is preferable to dry the printed surface of the ink receptive layer (L)9 at a tacky-dry level, in advance of the heating. This is because the sublimable dye can be diffused uniformly during the heat treatment.

By the heat treatment, the sublimable dye is sublimated in the ink receptive layer (L)9, penetrates the surface resin layer (A)1, migrates into the image formation resin layer (K)8, and is diffused for dyeing in the image formation resin layer (K)8, thereby forming the image. Thus, the image can be formed in the thickness direction of the image formation resin layer (K)8 so as to obtain the print layer (B), thereby obtaining the security sticker of the present invention.

Embodiment 6

Next, an example of the second method for manufacturing the security sticker of the present invention will be described.

As mentioned above, the second manufacturing method includes a dyeing step of heat-treating an original sheet of a security sticker (2) for obtaining a print layer (B), the original sheet of the security sticker (2) including:

a surface resin layer (A) that has a weak affinity with a sublimable dye and allows the dye to penetrate;

an image formation resin layer (K) that contains a low-molecular-weight compound with a molecular weight of 1300 or less in an amount of 0% to 20 wt % inclusive, and has an affinity with the dye;

a self-destructive film layer (C1); and a pressure-sensitive adhesive layer (D1) in this order, wherein the self-destructive film layer (C1) includes at least a dye migration preventive resin layer (E) for preventing migration of the dye and a self-destructive layer (F), and the dye migration preventive resin layer (E) is a biaxially stretched film that is stretched by 10% or more in a winding direction and in a width direction respectively, the film having a shrinkage ratio of 1.0% or less in the winding direction after being heated at 150° C. for 30 minutes, so as to sublimate the dye from the surface resin layer (A) side, allow the dye to penetrate the surface resin layer (A), introduce the dye into the image formation resin layer (K), and form an image in the image formation resin layer (K) in a thickness direction of the image formation resin layer (K).

Herein, the second manufacturing method is the same as the first manufacturing method, except using, as the dye migration preventive resin layer (E), the biaxially stretched film that is stretched by 10% or more in the winding direction and in the width direction respectively, the film having the shrinkage ratio of 1.0% or less in the winding direction after being heated at 150° C. for 30 minutes, instead of using the resin layer containing the vinyl resin with the glass transition temperature (Tg) of 70° C. or more and the SP value of 9.0 or more as a main component.

Embodiment 7

Next, an example of the third method for manufacturing the security sticker of the present invention will be described.

Figure 17:
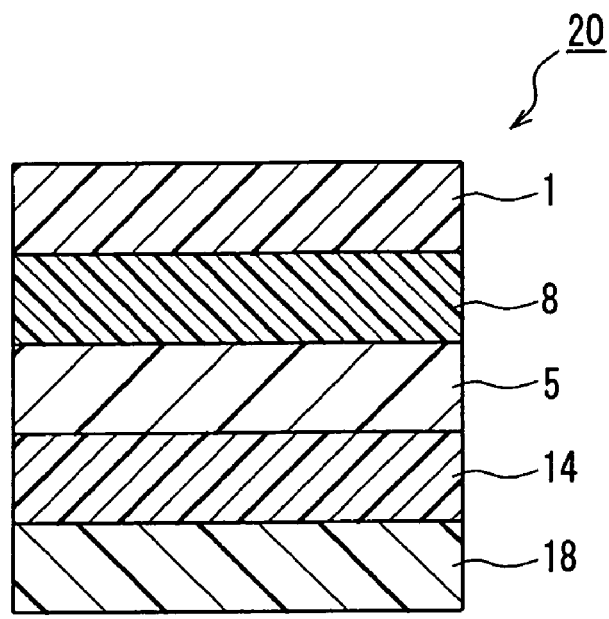
FIG. 17 is a cross-sectional view showing another example of the original sheet of the security sticker of the present invention.
Figure 18:
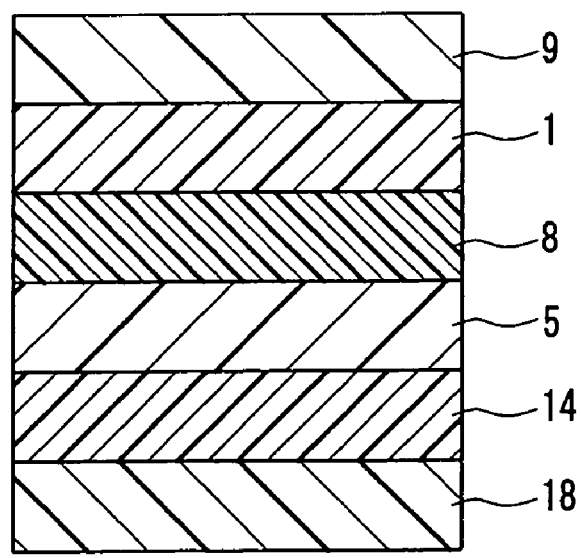
FIG. 18 is a cross-sectional view showing another example of the original sheet of the security sticker of the present invention.

FIGS. 17 and 18 are cross-sectional views showing an original sheet of a security sticker and the original sheet of the security sticker further including a releasable ink receptive layer (L), for explaining an example of the third method for manufacturing the security sticker of the present invention. In FIG. 17, the original sheet of the security sticker (3)20 includes a surface resin layer (A)1, an image formation resin layer (K)8, a dye migration preventive resin layer (E)5, a pressure-sensitive adhesive layer (D2) or an adhesive layer (H)14, and a releasing member (M)18 that are laminated in this order. In FIG. 18, the releasable ink receptive layer (L)9 is laminated on the surface resin layer (A)1 of the original sheet of the security sticker (3)20.

As mentioned above, the third method for manufacturing the security sticker includes:

a dyeing step of heat-treating an original sheet of a security sticker (3) for obtaining a print layer (B), the original sheet of the security sticker (3) including a surface resin layer (A)1 that has a weak affinity with a sublimable dye and allows the dye to penetrate, an image formation resin layer (K)8 that contains a low-molecular-weight compound with a molecular weight of 1300 or less in an amount of 0% to 20 wt % inclusive and has an affinity with the dye, a dye migration preventive resin layer (E)5 that contains a vinyl resin with a glass transition temperature (Tg) of 70° C. or more and a SP value of 9.0 or more and prevents migration of the dye, a pressure-sensitive adhesive layer (D2) or an adhesive layer (H), and a releasing member (M) in this order, so as to sublimate the dye from the surface resin layer (A) side, allow the dye to penetrate the surface resin layer (A), introduce the dye into the image formation resin layer (K), and form an image in the image formation resin layer (K) in a thickness direction of the image formation resin layer (K);

a step of releasing the releasing member (M) subsequently; and a step of laminating a self-destructive film layer (C2) of a laminate with the pressure-sensitive adhesive layer (D2) or the adhesive layer (H),
- the laminate including the self-destructive film layer (C2) and a pressure-sensitive adhesive layer (D1) in this order, and
- the self-destructive film layer (C2) including at least a supporting layer (J) and a self-destructive layer (F).

A material for the image formation resin layer (K)8, a method for printing on the transfer paper by using the ink containing the sublimable dye, the transfer paper, the method for the heat treatment, the releasable ink receptive layer (L)9, a method for printing in the ink receptive layer (L)9 formed on the surface resin layer (A)1 of the original sheet of the security sticker (3)20 (see FIG. 18) by using the ink containing the dye, and the like are the same as those in Embodiment 5. The self-destructive film layer (C2) of the laminate of the self-destructive film layer (C2) and the pressure-sensitive adhesive layer (D1)4 that are provided in this order is laminated with the pressure-sensitive adhesive layer (D2) or the adhesive layer (H) on the dye migration preventive resin layer (E)5.

Embodiment 8

Next, an example of the fourth method for manufacturing the security sticker of the present invention will be described below.

As mentioned above, the fourth manufacturing method includes:

a dyeing step of heat-treating an original sheet of a security sticker (4) for obtaining a print layer (B),
the original sheet of the security sticker (4) including
- a surface resin layer (A) that has a weak affinity with a sublimable dye and allows the dye to penetrate,
- an image formation resin layer (K) that contains a low-molecular-weight compound with a molecular weight of 1300 or less in an amount of 0% to 20 wt % inclusive and has an affinity with the dye,
- a dye migration preventive resin layer (E) which is a biaxially stretched film that is stretched by 10% or more in a winding direction and in a width direction respectively, the film having a shrinkage ratio of 1.0% or less in the winding direction after being heated at 150° C. for 30 minutes,
- a pressure-sensitive adhesive layer (D2) or an adhesive layer (H), and
- a releasing member (M) in this order, so as to sublimate the dye from the surface resin layer (A) side, allow the dye to penetrate the surface resin layer (A), introduce the dye into the image formation resin layer (K), and form an image in the image formation resin layer (K) in a thickness direction of the image formation resin layer (K);

a step of releasing the releasing member (M) subsequently; and a step of laminating a self-destructive film layer (C2) of a laminate with the pressure-sensitive adhesive layer (D2) or the adhesive layer (H),
- the laminate including the self-destructive film layer (C2) and a pressure-sensitive adhesive layer (D1) in this order, and
- the self-destructive film layer (C2) including at least a supporting layer (J) and a self-destructive layer (F).

Herein, the fourth manufacturing method is the same as the third manufacturing method, except using, as the dye migration preventive resin layer (E), the biaxially stretched film that is stretched by 10% or more in the winding direction and in the width direction respectively, the film having the shrinkage ratio of 1.0% or less in the winding direction after being heated at 150° C. for 30 minutes, instead of using the resin layer containing the vinyl resin with the glass transition temperature (Tg) of 70° C. or more and the SP value of 9.0 or more as a main component.

The security sticker of the present invention further may include a releasing member such as a releasing paper and a releasing film, being attached onto the pressure-sensitive adhesive layer (D1). The releasing member (M) is not limited particularly, and a known releasing member can be used.

Embodiment 9

Next, an example of the original sheet of the security sticker of the present invention will be described below.

FIG. 15 is a cross-sectional view showing an example of the original sheet of the security sticker of the present invention. The original sheet of the security sticker (1)10 includes a surface resin layer (A)1, an image formation resin layer (K)8, a self-destructive film layer (C1)3 and a pressure-sensitive adhesive layer (D1)4 that are laminated in this order.

As mentioned above, the original sheet of the security sticker of the present invention is an original sheet of a security sticker (1) for the first manufacturing method, including:
- a surface resin layer (A)1 that has a weak affinity with a sublimable dye and allows the dye to penetrate;
- an image formation resin layer (K)8 that contains a low-molecular-weight compound with a molecular weight of 1300 or less in an amount of 0% to 20 wt % inclusive, and has an affinity with the dye;
- a self-destructive film layer (C1)3; and
- a pressure-sensitive adhesive layer (D1)4 in this order, wherein the self-destructive film layer (C1)3 includes at least a dye migration preventive resin layer (E) for preventing migration of the dye and a self-destructive layer (F), and the dye migration preventive resin layer (E) is a resin layer containing a vinyl resin with a glass transition temperature (Tg) of 70° C. or more and a SP value of 9.0 or more as a main component.

The original sheet of the security sticker (1) can be manufactured by a method including: forming the respective layers by conventionally known methods using the above-described materials; and laminating them. For example, a paint solution containing a material for the surface resin layer (A)1 is applied on a polyester film as a supporting film, and is dried at room temperature or by heating, whereby the surface resin layer (A)1 is formed. A paint solution containing a material for the image formation resin layer (K)8 is applied on the surface resin layer (A)1, and is dried at room temperature or by heating, whereby the image formation resin layer (K)8 is formed. As a material for the dye migration preventive resin layer (E)5, a resin solution containing a vinyl resin with a glass transition temperature (Tg) of 70° C. or more and a SP value of 9.0 or more as a main component is applied on the image formation resin layer (K)8, and is dried at room temperature or by heating, whereby the dye migration preventive resin layer (E)5 is formed. Subsequently, the self-destructive layer (F)6 is formed on the dye migration preventive resin layer (E)5. Thereafter, a mixed solution containing a material for the pressure-sensitive adhesive layer (D1)4 is applied on the self-destructive layer (F)6, and is dried at room temperature or by heating, whereby the pressure-sensitive adhesive layer (D1)4 is formed. Thereby, the original sheet of the security sticker (1) can be obtained.

Embodiment 10

As mentioned above, the other original sheet of the security sticker of the present invention is an original sheet of a security sticker (2) for the second manufacturing method, including:

a surface resin layer (A) that has a weak affinity with a sublimable dye and allows the dye to penetrate;

an image formation resin layer (K) that contains a low-molecular-weight compound with a molecular weight of 1300 or less in an amount of 0% to 20 wt % inclusive, and has an affinity with the dye;

a self-destructive film layer (C1); and a pressure-sensitive adhesive layer (D1) in this order, wherein the self-destructive film layer (C1) includes at least a dye migration preventive resin layer (E) for preventing migration of the dye and a self-destructive layer (F), and the dye migration preventive resin layer (E) is a biaxially stretched film that is stretched by 10% or more in a winding direction and in a width direction respectively, the film having a shrinkage ratio of 1.0% or less in the winding direction after being heated at 150° C. for 30 minutes.

The original sheet of the security sticker (2) is the same as the original sheet of the security sticker (1), except using, as the dye migration preventive resin layer (E), the biaxially stretched film that is stretched by 10% or more in the winding direction and in the width direction respectively, the film having the shrinkage ratio of 1.0% or less in the winding direction after being heated at 150° C. for 30 minutes. The original sheet of the security sticker (2) can be manufactured by a method including: forming the respective layers by conventionally known methods using the above-described materials; and laminating them.

Embodiment 11

Next, another example of the original sheet of the security sticker of the present invention will be described below.

FIG. 17 is a cross-sectional view showing another example of the original sheet of the security sticker of the present invention. The original sheet of the security sticker (3)20 includes a surface resin layer (A)1, an image formation resin layer (K)8, a dye migration preventive resin layer (E)5, a pressure-sensitive adhesive layer (1)2) or an adhesive layer (H)14, and a releasing member (M)18 that are laminated in this order.

As mentioned above, the original sheet of the security sticker is an original sheet of a security sticker (3)20 for the third manufacturing method, including:

a surface resin layer (A)1 that has a weak affinity with a sublimable dye and allows the dye to penetrate;

an image formation resin layer (K)8 that contains a low-molecular-weight compound with a molecular weight of 1300 or less in an amount of 0% to 20 wt % inclusive, and has an affinity with the dye;

a dye migration preventive resin layer (E)5 that contains a vinyl resin with a glass transition temperature (Tg) of 70° C. or more and a SP value of 9.0 or more, and prevents migration of the dye;

a pressure-sensitive adhesive layer (D2) or an adhesive layer (H); and a releasing member (M) in this order.

The original sheet of the security sticker (3)20 can be manufactured by a method including: forming the respective layers by conventionally known methods using the above-described materials; and laminating them. For example, a paint solution containing a material for the surface resin layer (A)1 is applied on a polyester film as a supporting film, and is dried at room temperature or by heating, whereby the surface resin layer (A)1 is formed. A paint solution containing a material for the image formation resin layer (K)8 is applied on the surface resin layer (A)1, and is dried at room temperature or by heating, whereby the image formation resin layer (K)8 is formed. As a material for the dye migration preventive resin layer (E)5, a resin solution containing a vinyl resin with a glass transition temperature (Tg) of 70° C. or more and a SP value of 9.0 or more as a main component is applied on the image formation resin layer (K)8, and is dried at room temperature or by heating, whereby the dye migration preventive resin layer (E)5 is formed. Subsequently, the pressure-sensitive adhesive layer (D2) or the adhesive layer (H) 14, and the releasing member (M) 18 are laminated thereon, whereby the original sheet of the security sticker (3)20 can be obtained.

As mentioned above, the other original sheet of the security sticker of the present invention is an original sheet of a security sticker (4) for the fourth manufacturing method, including:

a surface resin layer (A) that has a weak affinity with a sublimable dye and allows the dye to penetrate;

an image formation resin layer (K) that contains a low-molecular-weight compound with a molecular weight of 1300 or less in an amount of 0% to 20 wt % inclusive, and has an affinity with the dye;

a dye migration preventive resin layer (E) which is a biaxially stretched film that is stretched by 10% or more in a winding direction and in a width direction respectively, the film having a shrinkage ratio of 1.0% or less in the winding direction after being heated at 150° C. for 30 minutes;

a pressure-sensitive adhesive layer (D2) or an adhesive layer (H); and a releasing member (M) in this order.

The original sheet of the security sticker (4) is the same as the original sheet of the security sticker (3), except using, as the dye migration preventive resin layer (E), a biaxially stretched film that is stretched by 10% or more in the winding direction and in the width direction respectively, the film having the shrinkage ratio of 1.0% or less in the winding direction after being heated at 150° C. for 30 minutes. The original sheet of the security sticker (4) can be manufactured by a method including: forming the respective layers by conventionally known methods using the above-described materials; and laminating them.

EXAMPLES

A more specific description will be provided below by way of examples. In the following examples, a "part" represents a part by weight. Similarly, "%" represents weight %.

Example 1

On an annealed biaxially stretched polyester film (produced by Teijin DuPont Films Japan Limited, trade name: HSLF8W, a shrinkage ratio in a winding direction of the film after being heated at 150° C. for 30 minutes was 0.5%) (a dye migration preventive resin layer (E)), a below-described resin composition for forming an image formation resin layer (K) was applied so as to obtain a dried film thickness of about 30 μm, and was dried by heating at about 140° C. for about 10 minutes, thereby obtaining the image formation resin layer (K). The content of a low-molecular-weight compound with a molecular weight of about 1300 or less in the thus obtained image formation resin layer (K) was less than 5%.

The resin composition for the image formation resin layer (K) contained: about 100 parts of BURNOCK D6-439 (an alkyd resin produced by Dainippon Ink and Chemicals, Inc., solid content hydroxyl value of 140, non-volatile content of 80%); about 82 parts of BURNOCK DN-980 (a polyisocyanate prepolymer produced by Dainippon Ink and Chemicals, Inc., non-volatile content of about 75%) as a hardener; about 1 part of TINUVIN 900 (produced by Ciba Specialty Chemicals Inc., a benzotriazole-based ultraviolet absorber); and about 1 part of TINUVIN 292 (produced by Ciba Specialty Chemicals Inc., a hindered amine-based light stabilizer).

Next, on the image formation resin layer (K) manufactured as mentioned above, a below-described resin composition for forming a surface resin layer (A) was applied so as to obtain a dried film thickness of about 20 μm, and was dried by heating at about 140° C. for about 10 minutes so as to form the surface resin layer (A), thereby obtaining a laminate of the dye migration preventive resin layer (E), the image formation resin layer (K) and the surface resin layer (A) (hereinafter, the laminate will be called a printing laminate A).

The resin composition contained: about 100 parts of a solution of a copolymer of hexafluoropropylene/ethylvinylether/VEOVA 9/monovinyl adipate=50/15/20/15 (in weight percentage) with a weight average molecular weight of about 45000 ("VEOVA 9": trade name, produced by Japan Epoxy Resins Co., Ltd., vinylester of branched aliphatic acid, solvent thereof was a mixed solvent of toluene/n-butanol=70/30 (in weight %), non-volatile content of about 50%) as a fluororesin; about 7.4 parts of sorbitol polyglycidylether with an epoxy equivalent of 170; about 0.6 part of diazabicyclooctane; 12 parts of DICTON WHITE A-5260 (titanium oxide, solid content of 75%); about 1 part of TINUVIN 900; and about 1 part of TINUVIN 292.

On an annealed biaxially stretched polyester film (produced by Teijin DuPont Films Japan Limited, trade name: HSF8WC-38, both sides thereof having been subjected to a treatment for providing easy adhesion, a shrinkage ratio of the film in a winding direction thereof after being heated at 150° C. for 30 minutes was 0.5% or less) (a supporting layer (J)) that was provided separately, counterfeit-preventing logo marks of "OFFICIAL USE" were printed in a traveling direction of the sheet and in a width direction thereof at constant intervals as a predetermined pattern, by addition type releasing silicone using a gravure coater. The addition type releasing silicone used here contained XSR7029A produced by GE TOSHIBA SILICONE CO., LTD./XSR7029B/XSR7029C/n-hexane=100/15/3/482, and this mixed solution was used for printing the logo marks and then was dried by heating at 140° C. for 60 seconds. Subsequently, after curing it at 25° C. for 24 hours, a mixed composition (a polycarbonate-based non-yellowing type urethane resin NY-331 (produced by Dainippon Ink and Chemicals, Inc., nonvolatile content of about 25%, solvent of DMF, 100% modulus of about 55 kg/cm$^2$)/CHROMAFLAIR PIGMENT (produced by Flex Products Inc.)=100/0.4) was applied on the counterfeit-preventing logo marks so as to obtain a dried film thickness of 10 μm by using a comma coater, thereby forming a self-destructive layer (F). Thus, a laminate of the supporting layer (J) and the self-destructive layer (F) was obtained.

On the supporting layer (J) of the laminate manufactured as mentioned above, a mixed solution containing: about 100 parts of an acrylic pressure-sensitive adhesive FINETAC SPS-1016 (produced by Dainippon Ink and Chemicals, Inc.,); about 2 parts of a crosslinking agent FINETAC TA-101-K (produced by Dainippon Ink and Chemicals, Inc., a chelate-type hardener for pressure-sensitive adhesives); and about 2 parts of TINUVIN 900 was applied and was dried by heating at about 100° C. for about 5 minutes so as to form a pressure-sensitive adhesive layer (D2) with a thickness of about 20 μm, thereby obtaining a laminate of the self-destructive layer (F), the supporting layer (J) and the pressure-sensitive adhesive layer (D2). Next, a surface of the pressure-sensitive adhesive layer (D2) and a surface of the dye migration preventive resin layer (E) of the printing laminate A were attached to each other, thereby obtaining a laminate that included the surface resin layer (A), the image formation resin layer (K), the dye migration preventive resin layer (E), the pressure-sensitive adhesive layer (D2), the supporting layer (J) and the self-destructive layer (F) in this order.

Next, on the self-destructive layer (F) of the laminate, a mixed solution containing: about 100 parts of an acrylic pressure-sensitive adhesive FINETAC SPS-1016 (produced by Dainippon Ink and Chemicals, Inc.,); about 2 parts of a crosslinking agent FINETAC TA-101-K (produced by Dainippon Ink and Chemicals, Inc., a chelate-type hardener for pressure-sensitive adhesives); about 2 parts of TINUVIN 900; and 0.2 parts of an ultraviolet absorber TINUVIN 900 was applied so as to obtain a dried film thickness of 20 μm, thus forming a pressure-sensitive adhesive layer (D1). Thereby, an original sheet of a security sticker (A) was obtained. It was dried by heating at about 100° C. for about 5 minutes, and a releasing member (M) was attached onto the pressure-sensitive adhesive layer (D1), thereby obtaining the original sheet of the security sticker with the releasing member (A).

Next, an image including a color vehicle, an issue date, a public emblem and a bar code to which individual information such as a zip code was input was printed on a transfer paper (Gradess S-coat Paper) by using a piezo-type printer (RJ-6000 produced by Mutoh Industries Ltd.), which was a kind of ink jet method printer provided separately. A sublimable-type ink for ink jet used here was an ink for ink jet containing a sublimable dye, which was produced by Kiwa Chemical Ind. Co., Ltd. (a set of six colors including cyan, magenta, yellow, black, light cyan and light magenta). The printed surface of the transfer paper was contacted with the surface resin layer (A) of the original sheet of the security sticker with the releasing member (A), and they were subjected to heat and pressing treatment by using a heat vacuum applicator (VacuSeal 4468 produced by HUNT EUROPE) at a degree of vacuum of 3.99×10$^3$ Pa (30 mmHg) and at a setting temperature of about 170° C. for about 7 minutes. By heating the original sheet of the security sticker (A) and the transfer paper together, the image printed on the transfer paper including the color vehicle, the issue date, the public emblem, and the bar code to which the individual information such as a zip code was input was dyed by being diffused in the image formation resin layer (K) of the original sheet of the security sticker with the releasing member (A) so as to transfer the image thereto, thereby obtaining the security sticker with the releasing member.

Next, the releasing member (M) was released, and the security sticker was attached to a rear window of the vehicle from the inside thereof, then the color vehicle, the issue date, the public emblem, and the bar code and the like to which the individual information such as the zip code was input could be identified visually clearly from an outside of the vehicle. In addition, the information could be read by a bar code reader through a glass of the rear window from the outside of the vehicle. Thereafter, the security sticker was released, then a part of the self-destructive layer (F) where the counterfeit-preventing logo marks of "OFFICIAL USE" were removed was left on a surface of the glass of the rear window, and the letters of "OFFICIAL USE" appeared on all over the face of the self-destructive layer (F). In addition, other part of the self-destructive layer (F) with the letters of "OFFICIAL USE" was left on the thus released security sticker, and thus it was possible to recognize that the security sticker was released from the rear window, at one glance. Moreover, the information in the released security sticker could not be tampered, and reuse of the released security sticker was also impossible. Furthermore, the security sticker was kept to be left in a state of being attached to a glass plate at 65° C. for 500 hours, but an edge of the image did not become blurred and sharpness of the image did not deteriorate.

Example 2

First, a resin composition for forming the surface resin layer (A) was applied on a polyester film as a supporting film so as to obtain a dried film thickness of about 20 µm, and was dried by heating at about 140° C. for about 10 minutes, thereby obtaining the surface resin layer (A).

Herein, the resin composition for the surface resin layer (A) contained: about 100 parts of FLUONATE K-703 (a fluororesin produced by Dainippon Ink and Chemicals, Inc., weight average molecular weight of 40000, solid content hydroxyl value of 72, non-volatile content of about 60%); about 25 parts of BURNOCK DN-950 (a hardener); about 1 part of TINUVIN 900 (an ultraviolet absorber); 15 parts of DICTON WHITE A-5260 (titanium oxide, solid content of 75%); and about 1 part of TINUVIN 292 (an antioxidant).

Next, a resin composition for forming an image formation resin layer (K) was applied on the surface resin layer (A) that was formed as mentioned above so as to obtain a dried film thickness of about 20 µm, and was dried by heating at about 140° C. for about 10 minutes, thereby obtaining the image formation resin layer (K). The content of a low-molecular-weight compound with a molecular weight of about 1300 or less in the thus obtained image formation resin layer (K) was less than 3%. The resin composition was polycarbonate-based non-yellowing type urethane resin NY-331 (produced by Dainippon Ink and Chemicals, Inc., nonvolatile content of about 25%, solvent of DMF, 100% modulus of about 55 $kg/cm^2$).

Next, a resin composition containing: about 100 parts of an acrylic copolymer (a-2) that was synthesized in Reference Example 2 described above; and about 50 parts of BURNOCK DN-950 as a hardener was applied on the image formation resin layer (K) so as to obtain a dried film thickness of about 15 µm, and was dried at about 140° C. for about 10 minutes, thereby manufacturing a dye migration preventive layer (E).

Next, a resin composition containing: about 100 parts of ACRYDIC 49-394-IM (produced by Dainippon Ink and Chemicals, Inc., nonvolatile content of about 50%) as an acrylic resin; and about 15 parts of BURNOCK DN-950 was applied on the dye migration preventive layer (E) so as to obtain a dried film thickness of about 20 µm, and was dried at about 140° C. for about 10 minutes, thereby manufacturing the flexible resin layer (G). Thus, a laminate of the surface resin layer (A), the image formation resin layer (K), the dye migration preventive resin layer (E) and a flexible resin layer (G) was obtained (hereinafter, the laminate will be called a printing laminate B).

In the same manner as Example 1, counterfeit-preventing logo marks of "OFFICIAL USE" were printed on the flexible resin layer (G) of the printing laminate B in a traveling direction of the sheet and in a width direction thereof at constant intervals. Subsequently, it was cured at 25° C. for 24 hours, then a mixed composition (polycarbonate-based non-yellowing type urethane resin NY-331 (produced by Dainippon Ink and Chemicals, Inc., nonvolatile content of about 25%, solvent of DMF, 100% modulus of about 55 $kg/cm^2$)/CHROMAFLAIR PIGMENT (produced by Flex Products Inc.)=100/0.4) was applied by using a comma coater on the surface on which the counterfeit-preventing logo marks were printed so as to obtain a dried film thickness of 10 µm, thereby forming a self-destructive layer (F).

A mixed solution containing: about 100 parts of an acrylic pressure-sensitive adhesive FINETAC SPS-1016 (produced by Dainippon Ink and Chemicals, Inc.,); about 2 parts of a crosslinking agent FINETAC TA-101-K (produced by Dainippon Ink and Chemicals, Inc., a chelate-type hardener for pressure-sensitive adhesives); and about 2 parts of TINUVIN 900 was applied on the self-destructive layer (F) that was formed as mentioned above, and was dried by heating at about 100° C. for about 5 minutes, thereby forming a pressure-sensitive adhesive layer (D1) with a thickness of about 20 µm.

Next, a biaxially stretched polyester releasing film (one surface thereof was coated with silicone, and the other surface was subjected to antistatic processing and was annealed, thickness of 50 µm, produced by Teijin DuPont Films Japan Limited, trade name of A-31, a shrinkage ratio in the winding direction of the film after being heated at 150° C. for 30 minutes was 0.4%) (a releasing member (M)) was attached, and the supporting film subsequently was released, thereby completing an original sheet of a security sticker (B) including the surface resin layer (A), the image formation resin layer (K), the dye migration preventive resin layer (E), the flexible resin layer (G), the self-destructive layer (F), the pressure-sensitive adhesive layer (D1) and the releasing member (M) that were laminated in this order.

Next, on the surface resin layer (A) of the original sheet of the security sticker (B), FLUONATE FEM-600 produced by Dainippon Ink and Chemicals, Inc., (solid content of 45%) as a water-based fluororesin was used to be applied so as to obtain a dried film thickness of about 15 µm, and was dried by heating at about 110° C. for about 5 minutes. Subsequently, on the thus dried film, MZ-100 produced by Takamatsu Oil & Fat Co., Ltd. (amorphous silicon dioxide, a mixture of polyurethane and a vinyl resin, solid content of 15%, content of a porous pigment in the solid content: about 56%) (an ink jet receptive agent) was applied so as to obtain a dried film thickness of about 30 µm, and was dried by heating at about 110° C. for about 5 minutes, thereby forming a releasable ink receptive layer (L). On the releasable ink receptive layer (L), an image was printed in the same manner as Example 1. Thereafter, heat treatment was performed for about 7 minutes by using a hot-air drier (Fine Oven DF6L produced by Yamato Scientific Co. Ltd.) that was set at about 170° C. Thereby, the sublimable dye penetrated by being diffused, and the image including a color vehicle, an issue date, a public emblem, and a bar code to which individual information such as a zip code of an owner was input penetrated by being diffused in the image formation resin layer (K) of the original sheet of the security sticker (B) so as to transfer the image thereto. Next, the releasable ink receptive layer (L) was released in a film state, thereby obtaining the security sticker with the releasing member (M).

The releasing member (M) was released, and the security sticker was attached to a rear window of the vehicle from the inside thereof, then the color vehicle, the issue date, the public emblem, and the bar code and the like to which the individual information such as the zip code was input could be identified visually clearly. In addition, the information could be read by using a bar code reader through a glass of the rear window from an outside of the vehicle. Thereafter, the security sticker was released, then a part of the self-destructive layer (F) where the counterfeit-preventing logo marks of "OFFICIAL USE" were removed was left on a surface of the glass of the rear window, and the letters of "OFFICIAL USE" appeared all over the face of the self-destructive layer (F). In addition, other part of the self-destructive layer (F) with the letters of "OFFICIAL USE" was left on the thus released security sticker, and thus it could be recognized that the security sticker was released from the rear window, at one glance. Moreover, the information in the released security sticker could not be tampered, and reuse of the released security sticker was also impossible. Furthermore, the security sticker was kept to be left in a state of being attached to a glass plate at 65° C. for 500 hours, but an edge of the image did not become blurred and sharpness of the image did not deteriorate.

Example 3

A printing laminate A was manufactured in the same manner as Example 1.

On the dye migration preventive resin layer (E) of the printing laminate (A), a surface of a pressure-sensitive adhesive layer (D2) of SB GALAXY/TS-ST50PR-P (trade name) (produced by Kurz Japan Ltd.) (a self-destructive film including: a polyester film as a supporting layer (J); a transparent hologram as a self-destructive layer (F); and the pressure-sensitive adhesive layer (D2) that were laminated in this order), from which a releasing member (M) was released, was attached.

Next, on a silicone-coated surface of a biaxially stretched polyester releasing film (one surface thereof was coated with silicone, and the other surface was subjected to antistatic processing and was annealed) (thickness of 50 µm) (produced by Teijin DuPont Films Japan Limited, trade name of A-31, a shrinkage ratio in a winding direction of the film after being heated at 150° C. for 30 minutes was 0.4%) (the releasing member (M)) that was provided separately, a mixed solution containing: about 100 parts of an acrylic pressure-sensitive adhesive FINETAC SPS-1016 (produced by Dainippon Ink and Chemicals, Inc.,); about 2 parts of a crosslinking agent FINETAC TA-101-K (produced by Dainippon Ink and Chemicals, Inc., a chelate-type hardener for pressure-sensitive adhesives); and about 2 parts of TINUVIN 900 was applied, and was dried by heating at about 100° C. for about 5 minutes, thereby forming a pressure-sensitive adhesive layer (D1) with a thickness of about 20 µm. Thereafter, the pressure-sensitive adhesive layer (D1) of the releasing member (M) was attached onto the polyester film of the self-destructive film, thereby completing an original sheet of a security sticker (C).

Next, similarly to Example 1, an image including a color vehicle, an issue date, a public emblem, and a bar code to which individual information such as a zip code was input was transferred to the image formation resin layer (K) of the original sheet of the security sticker (C), thereby obtaining the security sticker with the releasing member (M). The releasing member (M) was released, and the security sticker was attached to a rear window of the vehicle from an inside thereof, then the color vehicle, the issue date, the public emblem, and the bar code and the like to which the individual information such as the zip code was input could be identified visually clearly from the outside of the vehicle. In addition, the information could be read by using a bar code reader through a glass of the rear window from the outside of the vehicle. Thereafter, the security sticker was released, then a part of the hologram of the self-destructive layer (F) was left on a surface of the glass of the rear window, and other part of the hologram of the self-destructive layer (F) was left on the released security sticker, thus it could be recognized that the security sticker was released from the rear window, at one glance. Moreover, the information in the released security sticker could not be tampered, and reuse of the released security sticker was also impossible. Furthermore, the security sticker was kept to be left in a state of being attached to a glass plate at 65° C. for 500 hours, but an edge of the image did not become blurred and sharpness of the image did not deteriorate.

Comparative Example 1

A security sticker was obtained in the same manner as Example 1, except using, instead of the mixed solution of the resin composition for the image formation resin layer (K) of Example 1, a mixed solution containing: about 100 parts of BURNOCK D6-439 (an alkyd resin produced by Dainippon Ink and Chemicals, Inc., solid content hydroxyl value of 140, nonvolatile content of about 80%); about 82 parts of BURNOCK DN-980 (a polyisocyanate prepolymer produced by Dainippon Ink and Chemicals, Inc., nonvolatile content of about 75%) as a hardener; about 1 part of TINUVIN 900; about 1 part of TINUVIN 292; and 40 parts of a polyester plasticizer D620 (produced by J-PLUS Co., Ltd., molecular weight of about 800) as a polymer plasticizer. The content of a low-molecular-weight compound with a molecular weight of about 1300 or less in the thus obtained image formation resin layer (K) was about 22%.

The thus obtained security sticker was attached to a rear window of a vehicle from an inside thereof, but the information could not be read by using a bar code reader through a glass of the rear window. This was thought to be because the sublimable dye blurred at an edge of a bar of the bar code, and sharpness of the bar accordingly deteriorated, thus preventing the bar code reader from reading it. Furthermore, the security sticker was kept to be left in a state of being attached to a glass plate at 65° C. for 200 hours, and the edge of the image was blurred and the sharpness of the image deteriorated.

Comparative Example 2

A security sticker with the same configuration and dimensions was obtained by the same manufacturing method as Example 2, except omitting the step of forming the dye migration preventive resin layer (E) in Example 0.2.

The thus obtained security sticker was attached to a rear window of a vehicle from an inside thereof, and the information could be read by using a bar code reader through a glass of the rear window. However, the security sticker was kept to be left in a state of being attached to a glass plate at 65° C. for 200 hours, and an edge of the image was blurred and sharpness of the image deteriorated. In addition, the sublimable dye blurred at the edge of a bar of the bar code, and the sharpness of the bar accordingly deteriorated, and thus the information could not be read by using the bar code reader.

INDUSTRIAL APPLICABILITY

The security sticker of the present invention has a function of showing information on a vehicle and the like by being attached to an inner surface of a window glass of the vehicle or the like, and also can be used for a purpose of preventing counterfeit of a number plate of the vehicle.

The invention claimed is:

1. A security sticker, comprising:
   a surface resin layer that has a weak affinity with a sublimable dye and allows the dye to penetrate;
   a print layer that has an affinity with the dye and comprises an image formed in a thickness direction of the layer by the dye;
   a self-destructive film element; and
   a pressure-sensitive adhesive layer in this order,
   wherein the self-destructive film element comprises at least a dye migration preventive resin layer for preventing migration of the dye and a self-destructive layer,
   the print layer contains a low-molecular-weight compound with a molecular weight of 1300 or less in an amount of 0% to 20 wt % inclusive,
   the dye migration preventive resin layer is a resin layer containing a vinyl resin with a glass transition temperature (Tg) of 70° C. or more and a SP value of 9.0 or more as a main component, or is a biaxially stretched film that is stretched by 10% or more in a winding direction and in a width direction respectively, the film having a shrinkage ratio of 1.0% or less in the winding direction after being heated at 150° C. for 30 minutes.

2. The security sticker according to claim 1, wherein
   the dye migration preventive resin layer is a resin layer containing a vinyl resin with a glass transition temperature (Tg) of 70° C. or more and a SP value of 9.0 or more as a main component, and
   a flexible resin layer with an elongation percentage larger than an elongation percentage of the dye migration preventive resin layer is present between the dye migration preventive resin layer and the pressure-sensitive adhesive layer.

3. The security sticker according to claim 1, wherein the self-destructive layer is a film obtained by subjecting a fragile film or a supporting film to a regular or irregular releasing treatment, or a film comprising a hologram or a diffraction grating.

4. The security sticker according to claim 1, wherein the surface resin layer is a white resin layer.

5. The security sticker according to claim 1, wherein an image formed in the print layer comprises vehicle information comprising a registration number of the vehicle.

6. The security sticker according to claim 5, wherein the vehicle information comprises individual information concerning ownership.

7. A method for manufacturing the security sticker according to claim 1,
   wherein the dye migration preventive resin layer is a resin layer containing a vinyl resin with a glass transition temperature (Tg) of 70° C. or more and a SP value of 9.0 or more as a main component,
   the method comprising
      a dyeing step of heat-treating an original sheet of a security sticker for obtaining a print layer,
         the original sheet of the security sticker comprising:
            a surface resin layer that has a weak affinity with a sublimable dye and allows the dye to penetrate;
            an image formation resin layer that contains a low-molecular-weight compound with a molecular weight of 1300 or less in an amount of 0% to 20 wt % inclusive, and has an affinity with the dye;
            a self-destructive film element; and
            a pressure-sensitive adhesive layer in this order,
            wherein the self-destructive film element comprises at least a dye migration preventive resin layer for preventing migration of the dye and a self-destructive layer, and
            the dye migration preventive resin layer is a resin layer containing a vinyl resin with a glass transition temperature (Tg) of 70° C. or more and a SP value of 9.0 or more as a main component,
         so as to sublimate the dye from the surface resin layer side, allow the dye to penetrate the surface resin layer, introduce the dye into the image formation resin layer, and form an image in the image formation resin layer in a thickness direction of the image formation resin layer.

8. The method for manufacturing a security sticker according to claim 7, wherein the dyeing step is a step for obtaining the print layer,
   the dyeing step comprising:
      printing on a transfer paper by using an ink containing the dye so as to form an image on the transfer paper;
      contacting subsequently a surface of the transfer paper on which the image is formed with the surface resin layer of the original sheet of the security sticker; and then
      treating by heat,
   the method further comprising a step of removing the transfer paper after the heat treatment.

9. The method for manufacturing a security sticker according to claim 7, further comprising a step of forming at least one releasable ink receptive layer on the surface resin layer of the original sheet of the security sticker in advance,
   the releasable ink receptive layer
      being able to display by print,
      having absorption of an ink containing the dye on a surface side that is not contact with the surface resin layer,
      being able to be subjected to heat treatment for sublimating the dye and allowing the dye to penetrate the surface resin layer so as to form an image in the image formation resin layer, and
      being able to be released in a state of a film from the surface resin layer after the heat treatment,
   wherein the dyeing step is a step for obtaining the print layer,
      the dyeing step comprising printing on the ink receptive layer by using the ink containing the dye, and then treating by heat,
   the method still further comprising a step of releasing the ink receptive layer after the heat treatment.

10. An original sheet of a security sticker (1) for the method for manufacturing a security sticker according to claim 7, comprising:
    a surface resin layer that has a weak affinity with a sublimable dye and allows the dye to penetrate;
    an image formation resin layer that contains a low-molecular-weight compound with a molecular weight of 1300 or less in an amount of 0% to 20 wt % inclusive, and has an affinity with the dye;
    a self-destructive film element; and
    a pressure-sensitive adhesive layer in this order,
    wherein the self-destructive film element comprises at least a dye migration preventive resin layer for preventing migration of the dye and a self-destructive layer, and
    the dye migration preventive resin layer is a resin layer containing a vinyl resin with a glass transition temperature (Tg) of 70° C. or more and a SP value of 9.0 or more as a main component.

11. A method for manufacturing the security sticker according to claim 1, wherein the dye migration preventive resin layer is a biaxially stretched film that is stretched by 10% or more in a winding direction and in a width direction respectively, the film having a shrinkage ratio of 1.0% or less in the winding direction after being heated at 150° C. for 30 minutes, the method comprising a dyeing step of heat-treating an original sheet of a security sticker for obtaining a print layer, the original sheet of the security sticker comprising:

a surface resin layer that has a weak affinity with a sublimable dye and allows the dye to penetrate;

an image formation resin layer that contains a low-molecular-weight compound with a molecular weight of 1300 or less in an amount of 0% to 20 wt % inclusive, and has an affinity with the dye;

a self-destructive film element; and a pressure-sensitive adhesive layer in this order, wherein the self-destructive film element comprises at least a dye migration preventive resin layer for preventing migration of the dye and a self-destructive layer, and the dye migration preventive resin layer is a biaxially stretched film that is respectively stretched by 10% or more in a winding direction and in a width direction, the film having a shrinkage ratio of 1.0% or less in the winding direction after being heated at 150° C. for 30 minutes, so as to sublimate the dye from the surface resin layer side, allow the dye to penetrate the surface resin layer, introduce the dye into the image formation resin layer, and form an image in the image formation resin layer in a thickness direction of the image formation resin layer.

12. The method for manufacturing a security sticker according to claim 11, wherein the dyeing step is a step for obtaining the print layer, the dyeing step comprising:

printing on a transfer paper by using an ink containing the dye so as to form an image on the transfer paper;

contacting subsequently a surface of the transfer paper on which the image is formed with the surface resin layer of the original sheet of the security sticker; and then treating by heat, the method further comprising a step of removing the transfer paper after the heat treatment.

13. The method for manufacturing a security sticker according to claim 11, further comprising a step of forming at least one releasable ink receptive layer on the surface resin layer of the original sheet of the security sticker in advance, the releasable ink receptive layer being able to display by print, having absorption of an ink containing the dye on a surface side that is not contact with the surface resin layer, being able to be subjected to heat treatment for sublimating the dye and allowing the dye to penetrate the surface resin layer so as to form an image in the image formation resin layer, and being able to be released in a state of a film from the surface resin layer after the heat treatment, wherein the dyeing step is a step for obtaining the print layer, comprising printing on the ink receptive layer by using the ink containing the dye, and then treating by heat, the method still further comprising a step of releasing the ink receptive layer after the heat treatment.

14. An original sheet of a security sticker for the method for manufacturing a security sticker according to claim 11, comprising:

a surface resin layer that has a weak affinity with a sublimable dye and allows the dye to penetrate;

an image formation resin layer that contains a low-molecular-weight compound with a molecular weight of 1300 or less in an amount of 0% to 20 wt % inclusive, and has an affinity with the dye;

a self-destructive film element; and a pressure-sensitive adhesive layer in this order, wherein the self-destructive film element comprises at least a dye migration preventive resin layer for preventing migration of the dye and a self-destructive layer, and the dye migration preventive resin layer is a biaxially stretched film that is stretched by 10% or more in a winding direction and in a width direction respectively, the film having a shrinkage ratio of 1.0% or less in the winding direction after being heated at 150° C. for 30 minutes.

\* \* \* \* \*